(12) United States Patent
Gilboa

(10) Patent No.: US 7,971,194 B1
(45) Date of Patent: Jun. 28, 2011

(54) PROGRAMMING LANGUAGE TECHNIQUES FOR CLIENT-SIDE DEVELOPMENT AND EXECUTION

(75) Inventor: Yuval Gilboa, Pardesiya (IL)

(73) Assignee: SAP Portals Israel Ltd., Ra'anana (IL)

( * ) Notice: Subject to any disclaimer, the term of this patent is extended or adjusted under 35 U.S.C. 154(b) by 1395 days.

(21) Appl. No.: 11/454,610

(22) Filed: Jun. 16, 2006

Related U.S. Application Data

(60) Provisional application No. 60/691,890, filed on Jun. 16, 2005.

(51) Int. Cl.
  G06F 9/44 (2006.01)
  G06F 9/45 (2006.01)
(52) U.S. Cl. ........ 717/136; 717/106; 717/115; 717/116; 717/137; 717/140
(58) Field of Classification Search .................. 717/105, 717/106, 118, 140, 155, 162, 107, 108, 136, 717/137; 719/313
  See application file for complete search history.

(56) References Cited

U.S. PATENT DOCUMENTS

| | | | |
|---|---|---|---|
| 4,989,132 A | 1/1991 | Mellender et al. | |
| 5,459,868 A | 10/1995 | Kong | |
| 5,481,708 A * | 1/1996 | Kukol | 717/155 |
| 5,577,251 A | 11/1996 | Hamilton et al. | |
| 5,721,929 A | 2/1998 | Pasquariello | |
| 5,826,077 A | 10/1998 | Blakeley et al. | |
| 6,002,873 A | 12/1999 | Carter et al. | |
| 6,078,743 A | 6/2000 | Apte et al. | |
| 6,122,657 A | 9/2000 | Hoffman, Jr. et al. | |
| 6,145,120 A | 11/2000 | Highland | |
| 6,256,772 B1 | 7/2001 | Apte et al. | |
| 6,289,395 B1 | 9/2001 | Apte et al. | |
| 6,339,782 B1 | 1/2002 | Gerard et al. | |
| 6,467,086 B1 | 10/2002 | Kiczales et al. | |
| 6,567,819 B1 | 5/2003 | Cheng et al. | |
| 6,662,236 B1 | 12/2003 | Apte et al. | |
| 6,675,370 B1 | 1/2004 | Sundaresan | |
| 6,779,172 B1 * | 8/2004 | Weerawarana et al. | 717/115 |
| 6,813,762 B1 | 11/2004 | Plaxton | |
| 6,834,284 B2 * | 12/2004 | Acker et al. | 1/1 |
| 6,857,124 B1 | 2/2005 | Doyle | |
| 6,871,345 B1 | 3/2005 | Crow et al. | |
| 6,912,520 B2 | 6/2005 | Hankin et al. | |
| 7,146,615 B1 * | 12/2006 | Hervet et al. | 719/318 |

(Continued)

OTHER PUBLICATIONS

MacKinnon et al, Designing UML Diagrams for technical documentation, SIGDOC 04, Oct. 2004, ACM publishing.*

(Continued)

*Primary Examiner* — Emerson C Puente
*Assistant Examiner* — Charles M Swift
(74) *Attorney, Agent, or Firm* — Buckley, Maschoff & Talwalkar LLC

(57) ABSTRACT

Techniques that facilitate development of applications that may be executed by a client program. The client program may be a modeling framework that may be hosted by a browser or other client-side program. A programming language (referred to as "GmlScript") is provided for developing the applications. In one embodiment, the programming language provides various features such as object-oriented programming, client-side scripting, self-contained components, aspect-oriented programming, namespaces and self-contained components (kits), classes, methods, and properties, prototypes for multiple inheritance, events and listeners for implementing dynamics and constraints, transactions for ensuring model consistency and for undo/redo operations, objects persistency, dynamic loading, introspection, self documentation, preprocessing pragmas, and other features.

19 Claims, 37 Drawing Sheets

U.S. PATENT DOCUMENTS

| | | | |
|---|---|---|---|
| 7,305,656 B2* | 12/2007 | Fish et al. | 717/105 |
| 7,500,223 B2* | 3/2009 | DeSantis | 717/118 |
| 2002/0133811 A1* | 9/2002 | Duftler et al. | 717/140 |
| 2003/0120824 A1* | 6/2003 | Shattuck et al. | 709/313 |
| 2003/0120978 A1 | 6/2003 | Fabbrizio et al. | |
| 2003/0172197 A1 | 9/2003 | Dencker et al. | |
| 2005/0076344 A1 | 4/2005 | Goring et al. | |
| 2005/0154978 A1 | 7/2005 | Albornoz et al. | |
| 2005/0155027 A1* | 7/2005 | Wei | 717/162 |
| 2006/0064670 A1* | 3/2006 | Linebarger et al. | 717/106 |

OTHER PUBLICATIONS

Standard ECMA-262, "ECMA Script Language Specification," 3d Edition, Dec. 1999 (93 pages).

\* cited by examiner

SOURCE FILE: core.gml2:gui.elements.Interactor.gs

```
<@doc hierarchy="GMLDOM">
    Represents tightly coupled unit of interaction, that enables the user to view
    application data and to carry out related tasks. Interactors are displayed in
    rectangular regions and are arranged using a hierarchy of containers to form the
    user interface display.

<copyright>(c) SAP AG 2003-2006. All rights reserved.</copyright>
</doc@> abstract Class Interactor inherit Actor;

metadata title = 'Interactor';
metadata descr = 'A computational unit representing a single thread of user interaction';
metadata inStruct  = #[ARRAY];
metadata outStruct = #[ARRAY];

<@doc>The interactor's controls collection</doc@>
collection controls = gml2:Control[id];

<@doc>The interactor's position (X Y), relative to its parent's origin</doc@>
property pos = '0 0';

<@doc>The interactor's size (W H)</doc@>
property size = '320 240';

<@doc>Defines the interactor's z-index within its parent container</doc@>
property index = 0;

<@doc>Defines the interactor's connection plugs</doc@>
override method definePlugs()
    var mt=this.Class.metadata;

this.createPlug('#NS[UIPlugIn]', {
        struct:  mt.inStruct,
        name:    'in',
        anchor:  #[SVG_LEFT|SVG_START],
        offset:  15
    });

this.createPlug('#NS[UIPlugOut]', {
        struct:  mt.outStruct,
        name:    'out',
        anchor:  #[SVG_RIGHT|SVG_START],
        offset:  15
    });

end

<@doc>Fetches the interactors infosets collection</doc@>
override method getInfosets()
    var infosetId = this.getInfosetId();
    var infoset = this.unit.getElement(infosetId) || null;
    if (!infoset) return null;
    var I = {};
    I[infosetId] = infoset;
    return I;
end
```

FIG. 6

COMPILED FILE: core.gml2:gui.elements.Interactor.js

```
$C = $DOM.beginClassifier('Class', 'core.gml2:Interactor', 'core.gml2:Actor',
'core.gml2:classes.gui.interactors.Interactor.gs', function() {
this.controls = {};
this.plugs = {};
this.inLinks = {};
this.outLinks = {};
this.children = {};
}, 256);
$S = $C.superclass;
$M = function() {
this.title='Interactor';
this.descr='A computational unit representing a single thread of user interaction';
this.inStruct="Array";
this.outStruct="Array";
}
$M.prototype = $S.metadata;
$C.metadata = new $M;
$P = function(c) {
this.Class = {name:'Class', type:'object', modifiers:0x02b0};
this.controls = {name:'controls', type:'collection', value:null, modifiers:0x42,
typecheck:'gml2:Control'};
this.pos = {name:'pos', type:'string', value:'0 0', modifiers:0x02};
this.size = {name:'size', type:'string', value:'320 240', modifiers:0x02};
this.index = {name:'index', type:'number', value:0, modifiers:0x02};
}
$P.prototype = $S.properties;
$C.properties = new $P;
$C.properties.Class.value = $C;
$P = function(p) {
this.controls=p.controls;
this.pos=p.pos;
this.size=p.size;
this.index=p.index;
}
$C.persistent = new $P($C.properties);
$P = $C.prototype;
$P.Class=$C;
$P.controls=null;
$P.pos='0 0';
$P.size='320 240';
$P.index=0;
$M=$C.prototype.definePlugs=function() {
var mt=this.Class.metadata;
this.createPlug('core.gml2:UIPlugIn', {struct:mt.inStruct, name:'in', anchor:17, offset:15});
this.createPlug('core.gml2:UIPlugOut', {struct:mt.outStruct, name:'out', anchor:18,offset:15})
};
$M.Class=$C; $M.name='definePlugs'; $M.modifiers=0x0201;
$M=$C.prototype.getInfosets=function() {
var infosetId = this.getInfosetId();
var infoset = this.unit.getElement(infosetId) || null;
if (!infoset) return null;
var I = {};
I[infosetId] = infoset;
return I
};
$M.Class=$C; $M.name='getInfosets'; $M.modifiers=0x0201;
$C.events = $S.events;
$C.metadatafor = $S.metadatafor;
$DOM.endClassifier();
```

*FIG. 7*

| Declaration Members | Declaration Units | | | |
| --- | --- | --- | --- | --- |
| | Class | Aspect | Prototype | Configuration |
| Constructor | ✓ | ✓ | ✓ | |
| Destructor | | ✓ | | |
| Method | ✓ | ✓ | ✓ | |
| Property | ✓ | ✓ | ✓ | |
| Metadata | ✓ | ✓ | ✓ | |
| Event | ✓ | ✓ | ✓ | |
| Listener | ✓ | ✓ | ✓ | |
| Transaction | ✓ | ✓ | ✓ | |
| Configuration section | | | | ✓ |

*FIG. 10*

BASE CLASS:
```
1  <@doc>Represents a 2D point</doc@>
2  Class Point inherit Object;
3
4  property x = 0;
5  property y = 0;
6
7  constructor(x, y)
8      this.x = x;
9      this.y = y;
10 end
11
12 method distance(that) {
13     return SQRT( SQ(this.x-that.x) + SQ(this.y-that.y) );
14 end
15
```

DERIVED CLASS:
```
1  <@doc>Represents a circle</doc@>
2  Class Circle inherit Point;
3
4  property radius = 0;
5
6  constructor(x, y, radius)
7      this.supercall();
8      this.radius = radius;
9  end
10
11 method inside(pt) {
12     var d = this.distance(pt);
13     return d < this.radius;
14 end
15
```

*FIG. 11*

```
Class MyObject inherit BaseObject;

method toString()
    return this.Class.fullname + " " + (this.id || "object");
end method isa(className)
    if (className in this.Class.precedents) return true;
    return (($DOM.toQName(className)) in this.Class.precedents);
end
```

*FIG. 13*

```
//////////////////////////////////////////////////////////////////////
Class Connectable inherit Element;

metadata title  = 'Connectable';
metadata descr  = 'An element that can be connected to other elements in the same diagram';
metadata childElements = ['core.gml:Plug'];

//////////////////////////////////////////////////////////////////////
Class Configurable inherit Connectable;

metadata title  = 'Configurable';
metadata descr  = 'An element that owns a configurable infoshape';
metadata childElements = ['core.gml:Infoshape', 'core.gml:Plug'];

//////////////////////////////////////////////////////////////////////
Class Infoshape inherit Element;

metadata title  = 'Infoshape';
metadata descr  = 'A configurable collection of fields';
metadata icon16 = '#URL[~skin:symbols.infoshape16.gif]';
metadata childElements = ['core.gml:Field'];

//////////////////////////////////////////////////////////////////////
method isValidChild(child)
   var C=this.Class.metadata.childElements;
   if (!C) return false;
   for (var i=0, len=C.length; i<len; i++) {
      if (child.isa(C[i])) return true;
   }
   return false;
}
```

FIG. 15

```
1  <@doc>
2      Converts a point, a rectangle, or the mouse position from client window (physical)
3      to canvas viewport (logical) coordinates.
4
5      <param name="Form I" type="group">Convert a point</param>
6      <param name="pt:Point">A point (in physical units)</param>
7
8      <param name="Form II" type="group">Convert a rectangle</param>
9      <param name="rect:Rectangle">A rectangle (in physical units)</param>
10
11     <param name="Form III" type="group">Convert the mouse position</param>
12     <param name="evt:MouseEvent">The mouse event object</param>
13
14     <return type="Point|Rectangle">
15         The converted point or rectangle in logical viewport coordinates
16     </return>
17 </doc@>
18 method clientToCanvas(arg)
19     // fetch the overloaded argument
20     if (ISA(arg, 'Point', 'Rectangle')) {
21         var x=arg.x, y=arg.y;
22     } else if (ISA(arg, 'MouseEvent')) {
23         var x=arg.clientX, y=arg.clientY;
24     } else {
25         return null;
26     }
27
28     // do the calculation
29     var vp=this.viewport, sc=this.scale, obox=this.outerbox, ibox=this.innerbox;
30     x = (x-obox.x-ibox.x)/sc+vp.x;
31     y = (y-obox.y-ibox.y)/sc+vp.y;
32
33     // return the result
34     if (ISA(arg, 'Rectangle')) {
35         return new Rectangle(x, y, arg.w/sc, arg.h/sc);
36     } else {
37         return new Point(x, y);
38     }
39 end
```

*FIG. 16*

```
Class Context inherit Object;

<@doc>Constructs and initializes a new Context object</doc@>
constructor(model)
    this.level   = 1;
    this.isEmpty = false;
    this.model   = model;
    this.diagram = model.root;
    this.element = null;
    this.field   = null;
end
```

*FIG. 17*

```
...
var context = $ENV.createObject('core.gml:Context', $ENV.model);
...
```

*FIG. 18*

```
1  Aspect Shape for GmlDrawing inherit Graphic;
2
3  constructor(diagram, group)
4     this.group   = group || diagram;
5     this.diagram = diagram;
6     this.shapeNode = SVG.createElement(this.group.shapesLayer, 'g');
7     this.frameNode = SVG.createElement(this.shapeNode, 'rect', {color:base.@strokeColor});
8  end
9
10 destructor
11    SVG.removeElement(this.shapeNode);
12    SVG.removeElement(this.frameNode);
13 end
14
```

*FIG. 19*

```
<@doc>
    Notifies that an object property has been updated
    <param name="object" type="@GmlObject!">The object that was updated</param>
    <param name="name:s">The name of the property that was updated</param>
    <param name="value:v">The new property value</param>
    <param name="oldval:v">The old property value</param>
</doc@>
event onUpdateObject(object, name, value, oldval);
```

FIG. 20

```
method setProperty(name, value)
    var oldval = this[name];
    if (value === undefined) delete this[name]; else this[name] = value;
    this.setDirty();

var evt       = document.createEventObject();
    evt.type      = 'onUpdateObject';
    evt.object    = this;
    evt.name      = name;
    evt.value     = value;
    evt.oldval    = oldval;
    $ENV.fireModelEvent(evt);
end
```

```
//////////////////////////////////////////////////////////////////////
Aspect PlanarDiagram for GmlDrawing:

<@doc>
Fires when the user drops a shape sprite on the diagram.
Use this event to customize the drag and drop context menu.

<param name="object" type="@gml:GmlObject">The object on which the sprite has been dropped</param>
<param name="dnd" type="@dev:Controller!DND_OBJECT">The drag and drop data object</param>
<param name="pos:pt">The pointer position, in logical units relative to the diagram origin</param>
<param name="menu" type="@env:KitMenuBars!MENU_BAR">The context menu definition object.</param>
<param name="callback:Function" default="">Use this parameter to set a menu callback function</param>
<param name="cancel:b:false">Set this flag to ~true to cancel the event</param>
<remarks>
    The default drop behavior will be cancelled if either the ~cancel parameter is set to ~true, or
    the ~menu parameter is populated with menu items. In the latter case, the menu will be opened
    instead of the default drop behavior.
</remarks>
</doc@>
event onDropMenu(object, dnd, pos, menu, callback, cancel);

////////////////////////////////////////////////////////////////////// listen onDropMenu for core.gml:Scenario
    var diagram=object, cp=(pos.x)+' '+(pos.y);
    menu.append({signal:'FormView', text:'Add Form', icon:'#URL[~skin:symbols.formview16.gif]'});
    menu.append({signal:'GridView', text:'Add Grid', icon:'#URL[~skin:symbols.gridview16.gif]'});
    menu.append({signal:'ListView', text:'Add List', icon:'#URL[~skin:symbols.listview16.gif]'});
    menu.append();
    menu.append({signal:'cancel', text:'Cancel'});
    callback = quickCreate;

function quickCreate(signal) {
        if (signal == 'cancel') return;
        diagram.createElement('com.sap.rendering:'+signal, ('@g:pos:'cp));
    }
end
```

FIG. 24

```
1   <@program name="PropertiesEditor" exec="STUDIO" mode="FRAME"></program@>
2   <HTML xmlns:stb="urn:guimachine-com:storyboard" xmlns:gml="urn:guimachine-com:gml">
3   ...
4   
5   <SCRIPT language="JavaScript">
6   
7   USETUP();
8   LISTEN('onInit', paintEditor);
9   LISTEN('onShow', repaintEditor);
10  LISTEN('onContextSwitch', updateContext);
11  LISTEN('onUpdateObject', updateProperty);
12  
13  ...
14  
15  function paintEditor() {
16      // paint the properties editor
17  }
18  
19  function repaintEditor() {
20      // repaint the properties editor
21  }
22  
23  function updateContext(evt) {
24      // update the context and repaint the properties editor
25  }
26  
27  function updateProperty(evt) {
28      // update the property and repaint the properties editor
29  }
30  
31  ...
32  
33  </HTML>
```

- Line 8: raised when the window is first opened
- Line 9: raised whenever the window is exposed after being hidden by some other window
- Line 10: raised whenever the current selection is changed
- Line 11: raised whenever the currently selected object is modified These are GMLDOM events, but the listeners are local to this window and they stop receiving events whenever this window is concealed by another window

*FIG. 25*

```
//////////////////////////////////////////////////////////////////
Class Outport inherit Port:

attach svg:Unipolar override (
    fillColor:    '#F3F3F7',
    strokeColor:  '#726F9B',
    textColor:    '#726F9B', geometry: {
        resizeMode: #[SVG_KEEP_WIDTH|SVG_FIXED_HEIGHT], rotateMode: #[SVG_ROTATE_FULL|SVG_FLIP_VBODY],
        defWidth:30, defHeight:20, minWidth:30, poleStart:10, poleEnd:10, padding:[0,7.5,0,2.5]
    },
    frameParts: [
        {type:'path', d:'M @x1,@y1 L @x1,@y2 @x2-10),@y2 @x2,2.5 @x2,-2.5 @x2-10),@y1 2'}
    ],
    bodyParts: [
        {type:'text', action:'rename', text:'@name', x:0, y:3, 'font-size':'80%'}
    ]
)

//////////////////////////////////////////////////////////////////
Class ErrorPort inherit Outport:

attach svg:Unipolar override (
    fillColor:    '#F3E9EC',
    strokeColor:  '#800000',
    textColor:    '#800000',
    hilightColor: '#FF0000'
)

//////////////////////////////////////////////////////////////////
Class EventOutport inherit Outport:

attach svg:Unipolar override (
    frameParts: [
        {type:'path', d:'M @x1,@y1 L @x1,@y2 @x2-10),@y2 @x2,2.5 @x2,-2.5 @x2-10),@y1 2'},
        {type:'rect', x:'@x1-2', y:'@y1-1', width:4, height:'@h+2', fill:'currentColor', stroke:'none'}
    ]
)
```

```
Class GmlObject;

...

sealed method setProperty(name, value, silent)
    var C=this.Class, P=C.properties[name];
    if (!P || P.isReadonly) return false;
    return $ENV.recorder.execute('doSetProperty', this, name, value, this[name]);
end

...

transaction doSetProperty(object, name, value, oldval)

do, redo:
    var v0=value, v1=oldval;

undo:
    var v0=oldval, v1=value;

all:
    if (v0 === undefined) delete object[name]; else object[name] = v0;
    object.setDirty();
    var evt     = document.createEventObject();
    evt.type    = 'onUpdateObject';
    evt.object  = object;
    evt.name    = name;
    evt.value   = v0;
    evt.oldval  = v1;
    $ENV.fireModelEvent(evt);

end
```

*FIG. 29*

```
method removePrimaryUsages(diagram)
    var primary=this.getPrimaryUsages(diagram);
    if (ISEMPTY(primary)) return false;
    try {
        BEGIN('remove diagram');
        for (var k in primary) {
            var u=primary[k], d=u.diagram;
            if (d && !d.removeElement(u)) throw -1;
        }
        COMMIT();
        return true;
    } catch(e) {
        ROLLBACK();
        return false;
    }
end
```

*FIG. 30*

```
Transactions Monitor - Visual Composer SDK Tools - Microsoft Internet Explorer          _ | □ | x |
SDK Documentation | Objects Inspector | Classes Inspector | Kits Inspector | Events Monitor | Transactions Monitor | Source Files ⇧  Past
-3  move/attach shape(s)
-2  create shape
-1  move/attach shape(s)
 0  Present
+1  delete shape(s)
+2  move/attach shape(s)
+3  move/attach shape(s)
+4  connect shapes
⇩  Future
```

```
Step 0)  snapshot:      Diagram B
         viewport:      [-630.25,-197,100]
         focus:         SY Step 1)  transaction:   doDetachFromState
         element:       FormView SY
         state:         StateOR PI
         newpos:        "-408.25 -112"
         phase:         1
         oldpos:        "240 50"

Step 2)  transaction:   doSetProperty
         object:        StateOR PI
         name:          "gfpos"
         value:         "-405 40"
         oldval:        "-405 30"
         phase:         1

Step 3)  transaction:   doSetProperty
         object:        FormView Q2
         name:          "gfpos"
         value:         "-220 -70"
         oldval:        "-220 -80"
         phase:         1

Step 4)  snapshot:      (same as step 0)
```

[Refresh]

*FIG. 31*

```
Prototype Connectable;

Prototype Configurable;

Class Diagram inherit GmlObject;

Class Element inherit GmlObject;

Class Component inherit Diagram implement Configurable;

Class Interactor inherit Element implement Connectable, Configurable;

Class State inherit Element implement Connectable;
```

FIG. 32

```
1   ///////////////////////////////////////////////////////////////////
2   // STUDIO COMMANDS
3
4   Configure COMMANDS
5
6   $ENV.defineCommand({
7       id:         'FILE_CLOSE',
8       signal:     '$CTL->closeStudio',
9       text:       '#TEXT[CMD_FILE_CLOSE]',
10      icon:       '#URL[~skin:icons.close.gif]',
11      category:   'STANDARD'
12  });
13
14  $ENV.defineCommand({
15      id:         'FILE_EXIT',
16      signal:     '$CTL->exitStudio',
17      text:       '#TEXT[CMD_FILE_EXIT]',
18      icon:       '#URL[~skin:icons.exit.gif]',
19      category:   'STANDARD'
20  });
21
22  $ENV.defineCommand({
23      id:         'FILE_MANAGE',
24      signal:     'MODAL("#URL[common.ManageModelsDlg.htm]", null, true)',
25      text:       '#TEXT[CMD_FILE_MANAGE]',
26      icon:       '#URL[~skin:icons.library.gif]',
27      category:   'STANDARD'
28  });
29
30  $ENV.defineCommand({
31      id:         'FILE_NEW',
32      signal:     'MODAL("#URL[common.NewModelDlg.htm]", null, true)',
33      text:       '#TEXT[CMD_FILE_NEW]',
34      icon:       '#URL[~skin:icons.new.gif]',
35      key:        'Alt+N',
36      category:   'STANDARD'
37  });
38
39  ...
```

FIG. 33

```
1   ////////////////////////////////////////////////////////////////
2   // STUDIO MENUBARS
3
4   Configure MENUBARS
5   var menubar = $ENV.defineMenubar('MAIN_MENUBAR', 'STANDARD', 'Main Menu', false);
6
7   // FILE MENU
8   var submenu = $ENV.defineMenubar('FILE_MENU', 'STANDARD', 'File Menu', false);
9   menubar.append({menu:'FILE_MENU', text:'File'});
10  submenu.append({button:'FILE_NEW'});
11  submenu.append({button:'FILE_OPEN'});
12  submenu.append({button:'FILE_CLOSE'});
13  submenu.append();
14  submenu.append({button:'FILE_SAVE'});
15  submenu.append({button:'FILE_MANAGE'});
16  submenu.append({button:'FILE_TRANSPORT'});
17  submenu.append();
18  submenu.append({button:'FILE_PRINT'});
19  submenu.append();
20  submenu.append({button:'FILE_EXIT'});
21  submenu.append();
22
23  // EDIT MENU
24  var submenu = $ENV.defineMenubar('EDIT_MENU', 'STANDARD', 'Edit Menu', false);
25  menubar.append({menu:'EDIT_MENU', text:'Edit'});
26  submenu.append({button:'EDIT_UNDO'});
27  submenu.append({button:'EDIT_REDO'});
28  submenu.append();
29  submenu.append({button:'EDIT_CUT'});
30  submenu.append({button:'EDIT_COPY'});
31  submenu.append({button:'EDIT_PASTE'});
32  submenu.append();
33  submenu.append({button:'EDIT_PROPERTIES'});
34  submenu.append({button:'EDIT_RENAME'});
35  submenu.append({button:'EDIT_DELETE'});
36  submenu.append({button:'EDIT_DUPLICATE'});
37  submenu.append();
38
39  ...
```

*FIG. 34*

```
1   <@doc group="III. Elements">
2       The Element is the basic building block from which %GML% diagrams are composed.
3       <remarks>
4           A %GML% diagram is always made of a collection of one or more %GML% elements, referenced by unique
5           identifiers. Depending on its type, a %GML% element may contain a collection of one or more child
6           elements, referenced by unique identifiers. Elements can be nested in this way to any arbitrary depth.
7       </remarks>
8
9       <authors>Rinat Gilboa</authors>
10      <copyright>(c) SAP AG 2003. All rights reserved.</copyright>
11  </doc@>
12  Class Element inherit GmlObject:
13
14      <@doc>Gets the containing diagram</doc@>
15      virtual readonly property diagram = ^Diagram;
16
17      <@doc>Gets the parent object</doc@>
18      virtual readonly property parent = ^GmlObject;
19
20      <@doc>Gets the state that contains this element, if any</doc@>
21      virtual readonly property state = ^CompositeState;
22
23      <@doc>
24          Tests whether this element contains a given child element
25          <param name="child" type="@GmlObject:">The child element to test</param>
26          <return type="b">The test result</return>
27      </doc@>
28      override method contains(child)
29          for (var e=child; e && e.parent && e.parent != this; e=e.parent);
30          return e ? true : false;
31      end
32
33      <@doc>
34          Creates a new child element and inserts it under this element
35          <param name="className:s">The element class name</param>
36          <param name="values:Variant[id]" default="">A values bag for initializing the new element</param>
37          <return type="@Element:">The newly created element, or ~nil in case of any error</return>
38      </doc@>
39      sealed method createElement(className, values)
40          if (!values) values = {};
41          values.id = $ENV.model.newId();
42          var elem = $ENV.createObject(className, values);
43          if (!elem || !this.insertElement(elem)) return null;
44          return elem;
45      end
```

3.12) Class "Diagram"

The Diagram is the basic organizational unit in GML, enabling modularity and reusability.

Inherits: GmlObject

Properties

| Name | | Description |
|---|---|---|
| deleted | VR | Indicates whether the diagram is deleted (has been removed from the model since last open). |
| dirty | VR | Indicates whether the diagram is dirty (has been changed since last save). |
| model | VR | Gets the model that owns this diagram. |
| modified | R | Gets the last diagram modification date (in string representation). |
| version | R | Gets the diagram version number. |

Methods

| Name | Description |
|---|---|
| createDiagram | Creates a new diagram and inserts a corresponding diagram usage into this diagram. |
| getConnectablePlugs | Gets the table of all element plugs that can be connected to a given source plug. |
| getDependents | Gets the collection of diagrams that reference this diagram (and thus depend on it). |
| getPrecedents | Gets the collection of diagrams that are referenced by this diagram (and thus precede it). |
| getUsages | Gets the collection of all usage elements that point to this diagram. |

Remarks

- A GML model is always made of a collection of one or more GML diagrams, referenced by unique identifiers.
- A GML diagram, in turn, is made of a collection of one or more GML elements, referenced by unique identifiers.
- The GML diagram is also the basic unit for persistance and for communication. When a model is read, saved, or transported, it is always done by whole diagram units.

SAMPLE KITS MANIFEST

```xml
<?xml version="1.0" encoding="Windows-1255" ?>
<KITS_MANIFEST server_url="/VCDev05/" server_version="2.1.0">
  <Package name="com.sap.patterns" prefix="wdp" version="2.1.0" label="SAP WebDynPro Patterns">
  + <Kit name="wdp" package="com.sap.patterns" type="production" label="SAP WebDynPro Patterns">
  </Package>
  + <Package name="com.sap.patterns.gdp" prefix="gdp" version="2.1.0" label="WebDynPro GDP Pattern">
  + <Package name="com.sap.patterns.odp" prefix="odp" version="2.1.0" label="WebDynPro OIP/ODP Pattern">
  - <Package name="com.sap.rendering" prefix="ur" version="2.1.0" label="SAP Unified Rendering">
  + <Kit name="ur" package="com.sap.rendering" type="internal" label="SAP Unified Rendering">
  </Package>
  - <Package name="com.sap.services" prefix="esf" version="2.1.0" label="SAP Enterprise Services">
  + <Kit name="esf" package="com.sap.services" type="internal" label="SAP Enterprise Services">
  </Package>
  - <Package name="core.dev" prefix="dev" version="2.1.0" label="GM Storyboard">
  + <Kit name="storyboard" package="core.dev" type="internal" label="GUIMachine Storyboard">
  + <Package name="core.env" prefix="env" version="2.1.0" label="GM environment">
  - <Package name="core.gml" prefix="gml" version="2.1.0" label="GML Classes">
  + <Kit name="core" package="core.gml" type="internal" label="Core GML Classes">
  + <Kit name="lang" package="core.gml" type="internal" label="GUIMachine Modeling Language">
  </Package>
  + <Package name="core.lib" prefix="lib" version="2.1.0" label="General-purpose library">
  - <Package name="core.svg" prefix="svg" version="2.1.0" label="Vector Graphics">
  + <Kit name="drawing" package="core.svg" type="internal" label="Drawing Board">
  </Package>
  <AspectRole name="com.sap.rendering:UnifiedRendering" prefix="r" />
  <AspectRole name="core.svg:GmlDrawing" prefix="g" />
</KITS_MANIFEST>
```

*Fig. 38*

SAMPLE KITS CONFIGURATION

```xml
<?xml version="1.0" encoding="Windows-1255" ?>
<Configuration production="com.sap.patterns:wdp.kit" hashcode="54RGS3">
  <Kit package="core.dev" name="storyboard" version="2.1.0" />
  <Kit package="core.svg" name="drawing" version="2.1.0" />
  <Kit package="core.gml" name="core" version="2.1.0" />
  <Kit package="core.gml" name="lang" version="2.1.0" />
  <Kit package="com.sap.rendering" name="ur" version="2.1.0" />
  <Kit package="com.sap.patterns" name="wdp" version="2.1.0" />
  <Kit package="com.sap.patterns.odp" name="odp" version="2.1.0" />
  <Kit package="com.sap.patterns.gdp" name="gdp" version="2.1.0" />
</Configuration>
```

*FIG. 39*

Sample Kit Declaration File

```xml
<?xml version="1.0" encoding="Windows-1255" ?>
<Kit name="lang" package="core.gml" type="internal" label="GUIMachine Modeling Language">
<Summary>Provides a universal, declarative, language for the representation of user interface models.</Summary>
<Requires package="core.env" version="2.1.0" />
<Requires package="core.lib" version="2.1.0" />
<Import urn="core.kit" />
<Import urn="config.palette.gs" />
<Import urn="config.properties.gs" />
<Import urn="diagrams.Diagram.gs" />
<Import urn="diagrams.Module.gs" />
<Import urn="diagrams.Component.gs" />
<Import urn="diagrams.Scenario.gs" />
<Import urn="diagrams.Service.gs" />
<Import urn="elements.Element.gs" />
<Import urn="elements.Connectable.gs" />
<Import urn="elements.Configurable.gs" />
<Import urn="elements.Usage.gs" />
<Import urn="elements.ModuleUsage.gs" />
<Import urn="elements.ComponentUsage.gs" />
<Import urn="elements.ScenarioUsage.gs" />
<Import urn="elements.ServiceUsage.gs" />
<Import urn="elements.Actor.gs" />
<Import urn="elements.Interactor.gs" />
...
<Import urn="elements.State.gs" />
<Import urn="elements.CompositeState.gs" />
<Import urn="elements.StateOR.gs" />
<Import urn="elements.Note.gs" />
<Authors>Yuval Gilboa</Authors>
<Copyright>(c) SAP AG 2003. All rights reserved.</Copyright>
</Kit>
```

FIG. 40

PROGRAMMING LANGUAGE TECHNIQUES FOR CLIENT-SIDE DEVELOPMENT AND EXECUTION

CROSS-REFERENCES TO RELATED APPLICATIONS

The present application is a non-provisional of and claims benefit under 35 U.S.C. 119(e) of U.S. Provisional Application No. 60/691,890 filed Jun. 16, 2005 titled "PROGRAMMING LANGUAGE TECHNIQUES FOR CLIENT-SIDE DEVELOPMENT", the entire contents of which are herein incorporated by reference for all purposes.

BACKGROUND OF THE INVENTION

The present invention relates to programming languages and more particularly to techniques that facilitate development of web-based applications executable by a client.

A wide variety of application modeling frameworks are used to reduce the time and effort spent in developing software applications, especially business applications. One such modeling framework is SAP NetWeaver™ Visual Composer ("Visual Composer") from SAP®, Germany. Visual Composer facilitates model-driven content development that enables applications to be created easily. In one application, Visual Composer provides a powerful framework that facilitates the creation of content, for example for SAP Enterprise Portal, using modeling capabilities and a visual user interface that enables applications to be created without manually writing code (code-free creation of applications). It provides sophisticated, yet simple-to-use tools for creating portal snippets (e.g., SAP iViews) that process data from back-end systems, including SAP and third-party enterprise systems. Visual Composer reduces the effort to create applications, allows reuse of already existing applications, and reduces costs for maintenance. Visual Composer is a fully Web-based application allowing (virtual) teams to easily build or customize pages and iViews as needed, accessing the software from virtually any machine worldwide.

Extensible application modeling frameworks such as Visual Composer have to present a programming model to enable developers to access, manipulate, and extend the underlying application model. Further, these tools are typically client-side tools that have to work within a browser. They also need to support distributed development and evolution of modeling languages across separate teams.

Historically, such modeling frameworks have used languages such as ECMAScript Language (defined in the official ECMA-262 standard, popularly known as "JavaScript") for programming. For example, in the past Visual Composer used JavaScript, primarily because it is universally prevalent, available on almost all client machines, and widely known by Web developers, especially those from the Java community. However, JavaScript has several limitations that impact its effectiveness as a programming language for use with a modeling framework such as Visual Composer. For example, JavaScript is object-based but not object-oriented. It does not support concepts such as events, properties, transactions, aspects, and the like. It does not have a namespaces mechanism—all program entities reside in the same global space. JavaScript objects are also difficult to persist and JavaScript code is difficult to load on demand. As a result, the use of JavaScript for application development has several limitations.

Accordingly, a language and techniques are desired that are better suited for use with modeling frameworks, and with other software tools in general.

BRIEF SUMMARY OF THE INVENTION

Embodiments of the present invention provide techniques that facilitate development of applications that may be executed by a client-side programs. A programming language (referred to as "GmlScript") is provided for developing the applications. For example, a GmlScript application may be executed by a modeling framework executing on a client machine.

In one embodiment, the GmlScript provides various features such as object-oriented programming, client-side scripting, self-contained components, aspect-oriented programming, namespaces and self-contained components (kits), classes, methods, and properties, prototypes for multiple inheritance, events and listeners for implementing dynamics and constraints, transactions for ensuring model consistency and for undo/redo operations, objects persistency, dynamic loading, introspection, self documentation, preprocessing pragmas, and other features.

According to an embodiment of the present invention, techniques are provided for processing a request from a client program. In one embodiment, the client program is a modeling framework. A request for an application is received from a client program. A first source code corresponding to the application is determined, the first source code written in a first programming language, the first source code comprising code declaring at least a first object class that inherits from another object class. The first source code is compiled to generate a second source code in a second programming language, wherein the second source code is executable by the client program executing within a modeling framework.

According to an embodiment of the present invention, the second language may be JavaScript. The client program may be hosted by a web browser or other client-side program and the second source code is executed within the web browser.

According to an embodiment of the present invention, the first source code may comprise code for instantiating an object of the first object class, wherein the instantiated object is persistent. The first source code may declare a property of a first data type associated with the first object class. The first source code may comprise an event declaration that causes instantiation of an event object that provides a notification upon occurrence of an event specified by the event declaration. The first source code may comprises a listener block that is invoked when the event specified by the event declaration occurs. The first source code may declare an aspect class that is attached to the first object class and causes an aspect object to be instantiated and attached to an object instantiated from the first object class. The first source code may comprise an event transaction declaration that causes instantiation of a transaction object that records updates to other one or more objects.

According to an embodiment of the present invention, the first source code may comprise one or more pragmas that are identified prior to compiling of the first source code. Each pragma in the one or more pragmas is substituted with a corresponding pragma output.

According to an embodiment of the present invention, the second source code comprises metadata that is used to perform introspection of an object created by execution of second source code.

According to an embodiment of the present invention, the second source code may be executed by the client program.

This may involve loading one or more classes identified in the second source code, and loading one or more objects instantiated from the one or more classes. A namespace of the client program may be partitioned into at least a first namespace and a second namespace, wherein a class from the one or more classes and an object from the one or more objects instantiated from the one or more classes are loaded in either the first namespace or the second namespace.

According to an embodiment of the present invention, techniques are provided for processing a request received from a client machine in a network environment comprising a client machine coupled to a server machine via a communication network. The server machine may store a set of source files, receive a request for an application from a client program executing on the client machine, and determine, responsive to the request, first source file for the application from the set of source files, the first source file written in a first language, the first source file comprising a set of pragmas, and code declaring at least a first object class that inherits from another object class. The server machine may generate a preprocessed first source file by replacing each pragma in the first source file with a corresponding pragma output. The server machine may generate a second source file from the preprocessed first source file, wherein the second source file is written in a second language executable by the client program and communicate the second source file to the client machine over the communication network. The second source file may be executed by the client program.

The foregoing, together with other features, embodiments, and advantages of the present invention, will become more apparent when referring to the following specification, claims, and accompanying drawings.

BRIEF DESCRIPTION OF THE DRAWINGS

FIG. 6 depicts an example GmlScript source file before it is passed as input to a GmlScript compiler according to an embodiment of the present invention;

FIG. 7 depicts an example of a JavaScript compiled file generated by a GmlScript compiler according to an embodiment of the present invention;

FIG. 10 lists a set of declaration members and the corresponding declaration units according to an embodiment of the present invention;

FIG. 11 depicts an example of a base class and a derived class according to an embodiment of the present invention;

FIG. 13 depicts an example of use of property Class that enables introspection according to an embodiment of the present invention;

FIG. 15 depicts a metadata declaration example according to an embodiment of the present invention;

FIG. 16 depicts an example of method overloading according to an embodiment of the present invention;

FIG. 17 depicts an example of a GmlScript constructor according to an embodiment of the present invention;

FIG. 18 depicts an example of invoking a constructor according to an embodiment of the present invention;

FIG. 19 depicts an example of a destructor according to an embodiment of the present invention;

FIG. 20 depicts an example of declaring an event according to an embodiment of the present invention;

FIG. 21 depicts an example of firing an event according to an embodiment of the present invention.

FIG. 22 depicts a tool for monitoring events according to an embodiment of the present invention;

FIG. 24 depicts a drag n' drop listener example according to an embodiment of the present invention;

FIG. 25 depicts an example of a local listener according to an embodiment of the present invention;

FIG. 27 depicts an example of attaching aspects to classes according to an embodiment of the present invention;

FIG. 28 depicts an example of aspect persistence according to an embodiment of the present invention;

FIG. 29 depicts an example of a transaction according to an embodiment of the present invention;

FIG. 30 depicts an example of a nested transaction according to an embodiment of the present invention;

FIG. 31 depicts an example of a tool for monitoring transactions according to an embodiment of the present invention;

FIG. 32 depicts an example of prototypes providing a controlled form of multiple inheritance according to an embodiment of the present invention;

FIG. 33 depicts an example of a commands configuration section according to an embodiment of the present invention;

FIG. 34 depicts an example of a menubars configuration section according to an embodiment of the present invention;

FIG. 35 depicts a documentation example according to an embodiment of the present invention;

FIG. 36 depicts a tool for viewing documentation according to an embodiment of the present invention;

FIG. 38 depicts a sample kits manifest according to an embodiment of the present invention;

FIG. 39 depicts a sample kits configuration file according to an embodiment of the present invention;

FIG. 40 depicts a sample kits declaration file according to an embodiment of the present invention.

DETAILED DESCRIPTION OF THE INVENTION

In the following description, for the purposes of explanation, specific details are set forth in order to provide a thorough understanding of the invention. However, it will be apparent that the invention may be practiced without these specific details.

The term "JavaScript" is used to refer to different versions of the ECMAScript Language. The ECMAScript Language is specified in the official ECMA-262 standard.

Embodiments of the present invention provide techniques that facilitate development of applications that may be executed by a client-based program such as a modeling framework or other category of software. A programming language (referred to herein as "GmlScript") is provided for developing the applications. GmlScript may be used as a scripting programming language. In one embodiment, the programming language provides various features such as object-oriented programming, client-side scripting, self-contained components, aspect-oriented programming, namespaces and self-contained components (kits), classes, methods, and properties, prototypes for multiple inheritance, events and listeners for implementing dynamics and constraints, transactions for ensuring model consistency and for undo/redo operations, objects persistency, dynamic loading, introspection, self documentation, preprocessing pragmas, and other features.

GmlScript may be used to write applications and programs that can be executed by a client-side program. For example, the GmlScript applications may be executed by a modeling framework. A modeling framework is a software program that enables creation of a model. The model created using a modeling framework may be for a system, application, and the like, and is typically (but not necessarily) created using some graphical notation. In one embodiment, a modeling framework may be a design-time framework or set of tools that enables applications to be developed using visual tools without having to no any programming. An example of a modeling tool is SAP NetWeaver™ Visual Composer ("Visual Composer") from SAP®, Germany. Other examples of a modeling framework include Rational Rose, Borland Together, Microsoft Visio, and others.

The client program that executes a GmlScript application may be hosted by a client-side program such as a web browser. A browser is a software application that enables a user to display and interact with text, images, and other information typically located on a server on the World Wide Web or other network. Commonly used browsers include Mozilla Firefox, Microsoft Internet Explorer, Opera, Netscape, and Apple Safari. Although browsers are typically used to access the World Wide Web, they can also be used to access information provided by web servers in private networks or content in file systems.

Figure 1:
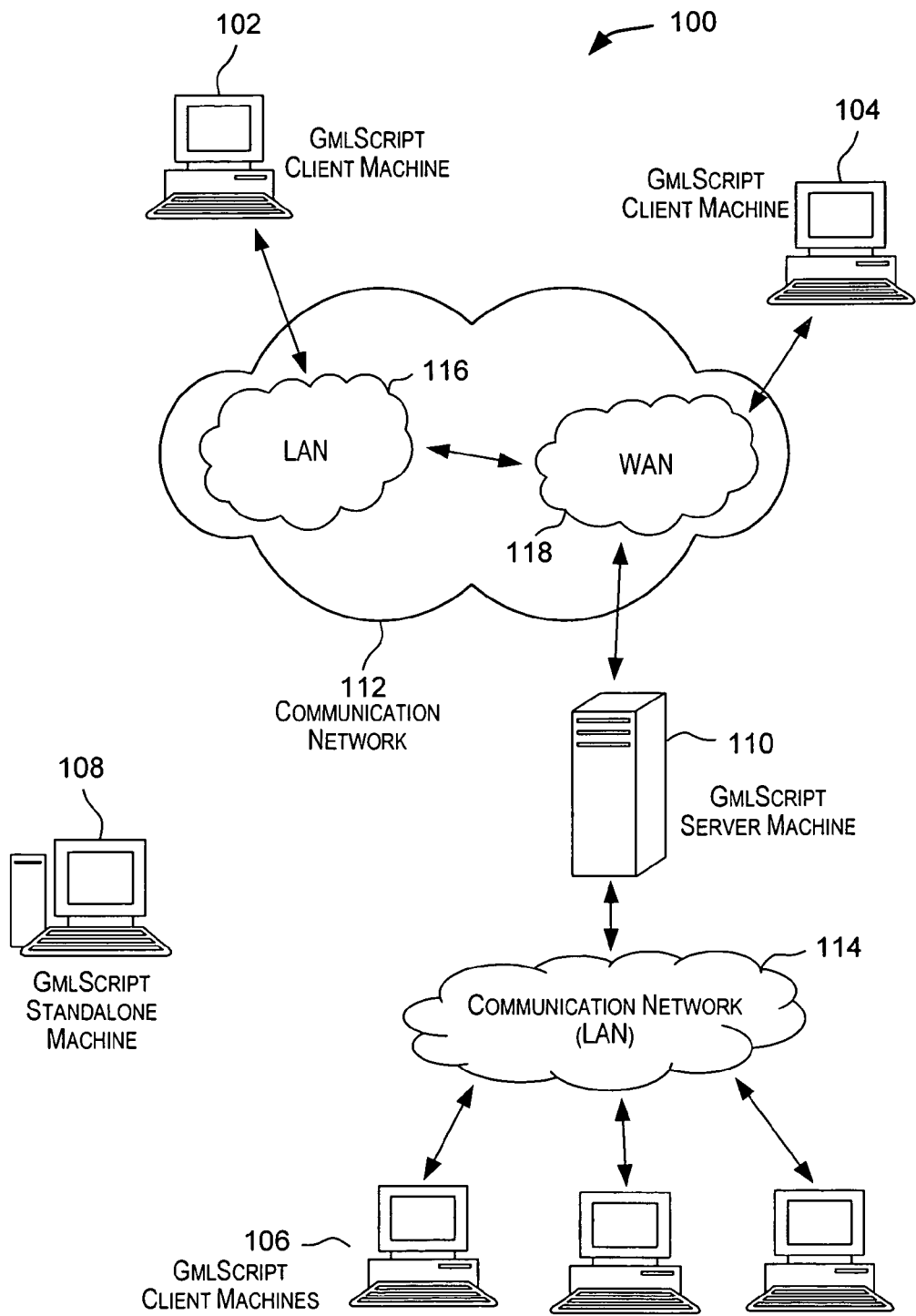
FIG. 1 is a simplified block diagram of a network system that may incorporate an embodiment of the present invention.

FIG. 1 is a simplified block diagram of a network system 100 that may incorporate an embodiment of the present invention. Network system 100 comprises systems that facilitate execution of applications written using GmlScript. Network System 100 depicted in FIG. 1 is merely illustrative of an embodiment incorporating the present invention and is not intended to limit the scope of the invention as recited in the claims. One of ordinary skill in the art would recognize other variations, modifications, and alternatives.

Any entity that requests data or services is referred to as a client. An entity that services a client's request is referred to as a server. Any program or application that is the source of a request for a GmlScript application is referred to as a GmlScript client. A machine that hosts a GmlScript client is referred to as a GmlScript client machine. A program or application that responds to a GmlScript application request received from a GmlScript client is referred to as a GmlScript server. A machine that hosts a GmlScript server is referred to as a GmlScript server machine. A GmlScript server may execute on more than one machine. A GmlScript client and a GmlScript server may also be hosted by the same machine, in which case, the machine is both a GmlScript client machine and a GmlScript server machine.

As depicted in FIG. 1, one or more client machines may be coupled to a server machine 110 via one or more communication networks. In FIG. 1, client machines 102 and 104 are coupled to server machine 110 via communication network 112 and client machines 106 are coupled to server machine 110 via communication network 114. The communication networks may include a local area network, a wide area network, a wireless network, an Intranet, the Internet, a private network, a public network, a switched network, or any other suitable communication network. Communication networks 112 and 114 may comprise many interconnected computer systems and communication links such as hardwire links, optical links, satellite or other wireless communications links, wave propagation links, or any other mechanisms for communication of information. Various communication protocols may be used to facilitate communication of information via communication networks 112 and 114, including TCP/IP, HTTP protocols, extensible markup language (XML), wireless application protocol (WAP), protocols under development by industry standard organizations, vendor-specific protocols, customized protocols, and others.

In one embodiment, source code for a GmlScript application is deployed and stored on GmlScript server machine 110. Server machine 110 is configured to serve the GmlScript source code to a client machine over a communication network in response to a request for the application received from a GmlScript client hosted by the client machine. When a GmlScript client executing on a client machine receives a GmlScript application, it installs it in memory and executes it. In one embodiment, the client executes the GmlScript application using a JavaScript engine and the application is executed within a browser. In one embodiment, the client program that executes the GmlScript application is a modeling framework such as Visual Composer.

The GmlScript application deployment model is based upon the Web deployment model of serving HTML pages to Web clients, thus enabling GmlScript applications to run anywhere a Web application can run. Various network configurations can be supported by the GmlScript deployment model. For example, as depicted in FIG. 1, a GmlScript client machine 104 is connected through a wide-area network (WAN) 118 to server 110, GmlScript client machines 106 are connected through a local-area network (LAN) 114 to server 110, and GmlScript client machine 102 is connected through an interconnected LAN/WAN network 116/118 to server 110.

In one embodiment, a GmlScript server and a GmlScript client may be hosted by the same machine. For example, as shown in FIG. 1, standalone machine 107 may host both the GmlScript server and the client. Machine 107 thus functions both as a GmlScript server machine and a GmlScript client machine.

Figure 2:
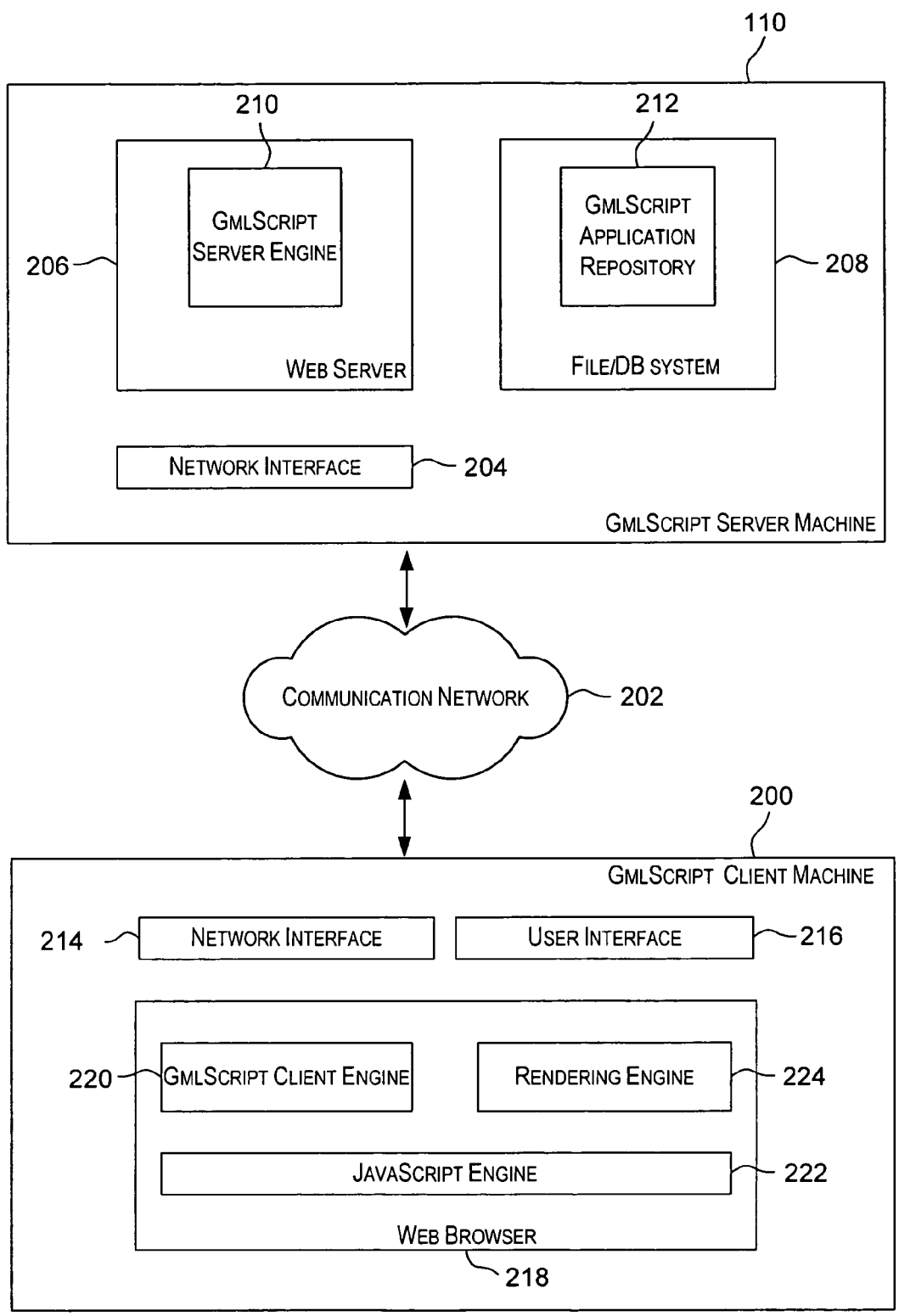
FIG. 2. depicts components of a GmlScript client machine and a GmlScript server machine that facilitate processing according to an embodiment of the present invention.

FIG. 2. depicts components of a GmlScript client machine 200 and a GmlScript server machine 110 that facilitate processing according to an embodiment of the present invention. The components depicted in FIG. 2 are merely illustrative of an embodiment incorporating the present invention and are not intended to limit the scope of the invention as recited in the claims. One of ordinary skill in the art would recognize other variations, modifications, and alternatives. The components depicted in FIG. 2 may be implemented in hardware, software (e.g., software code or modules executed by a processor), or combinations thereof.

As depicted in FIG. 2, GmlScript client machine 200 is coupled to GmlScript server machine 110 via communication network 202. GmlScript client machine 200 represents any GmlScript client machine that communicates with a GmlScript server over a communication network. For example, client machine 200 depicted in FIG. 2 may be any one of the client machines 102, 104, and 106 depicted in FIG. 1.

GmlScript server machine 110 is configured to receive requests for a GmlScript application from one or more clients and respond to the requests by sending compiled code corresponding to the requests to the requesting GmlScript client machines. As depicted in FIG. 2, GmlScript server machine 110 comprises a network interface 204, a web server 206, and a file and/or database system 208. Network interface 204 is configured to facilitate communications to and from GmlScript server machine 110. Web server 206 is configured to process web requests. In one embodiment, a GmlScript server engine 210 is implemented as a component of web server 206. GmlScript server engine 210 is configured to perform processing for responding to GmlScript application requests. GmlScript server engine 210 is configured to search database 208 for GmlScript source code corresponding to an application request received from a GmlScript client, compile the source code, and communicate the results of the compilation to the requesting GmlScript client. In one embodiment, the GmlScript application source code is compiled to JavaScript code. In alternative embodiments, the GmlScript application source code may be compiled to other languages that are capable of being executed by a client-side application such as a browser.

File/database system 208 provides a repository for storing information related to GmlScript server processing and application-related data. In one embodiment, a GmlScript application repository 212 is implemented as a component of the file/database system 208 and stores the GmlScript application related data. For example, repository 212 may store GmlScript source code and other related data for one or more applications.

As depicted in FIG. 2, GmlScript client machine 200 comprises a network interface 214, a user interface 216, and a web browser 218 (or any other program capable of executing client-side applications). Network interface 214 is configured to facilitate communications to and from GmlScript client machine 200. Web browser 218 includes a rendering engine 224 for rendering an application on user interface 216 and a JavaScript engine 222 for executing the application code. In one embodiment, a GmlScript client engine 220 is implemented as a component of the web browser 218 and is executed by JavaScript engine 222.

GmlScript client engine 220 is configured to executes client programs such as a modeling framework. GmlScript client engine 220 is configured to initiate a request for a GmlScript application and communicate the request to a GmlScript server. Upon receiving the compiled code in response to the request from the GmlScript server, GmlScript client engine 220 is configured to execute the compiled code on the client machine. In the embodiment depicted in FIG. 2, GmlScript client engine 220 is hosted within browser 218 and the compiled code may be executed within browser 218. In one embodiment, if the compiled code is JavaScript, then the application may be executed using JavaScript engine 222. Other language engines may be provided in other embodiments.

In alternative embodiments, GmlScript client engine 220 may be hosted by other programs executing on client machine 200. These programs may provide JavaScript or other language engines for executing the compiled code received from GmlScript server machine 110. Output from the application execution may be provided via user interface 216.

Figure 3:
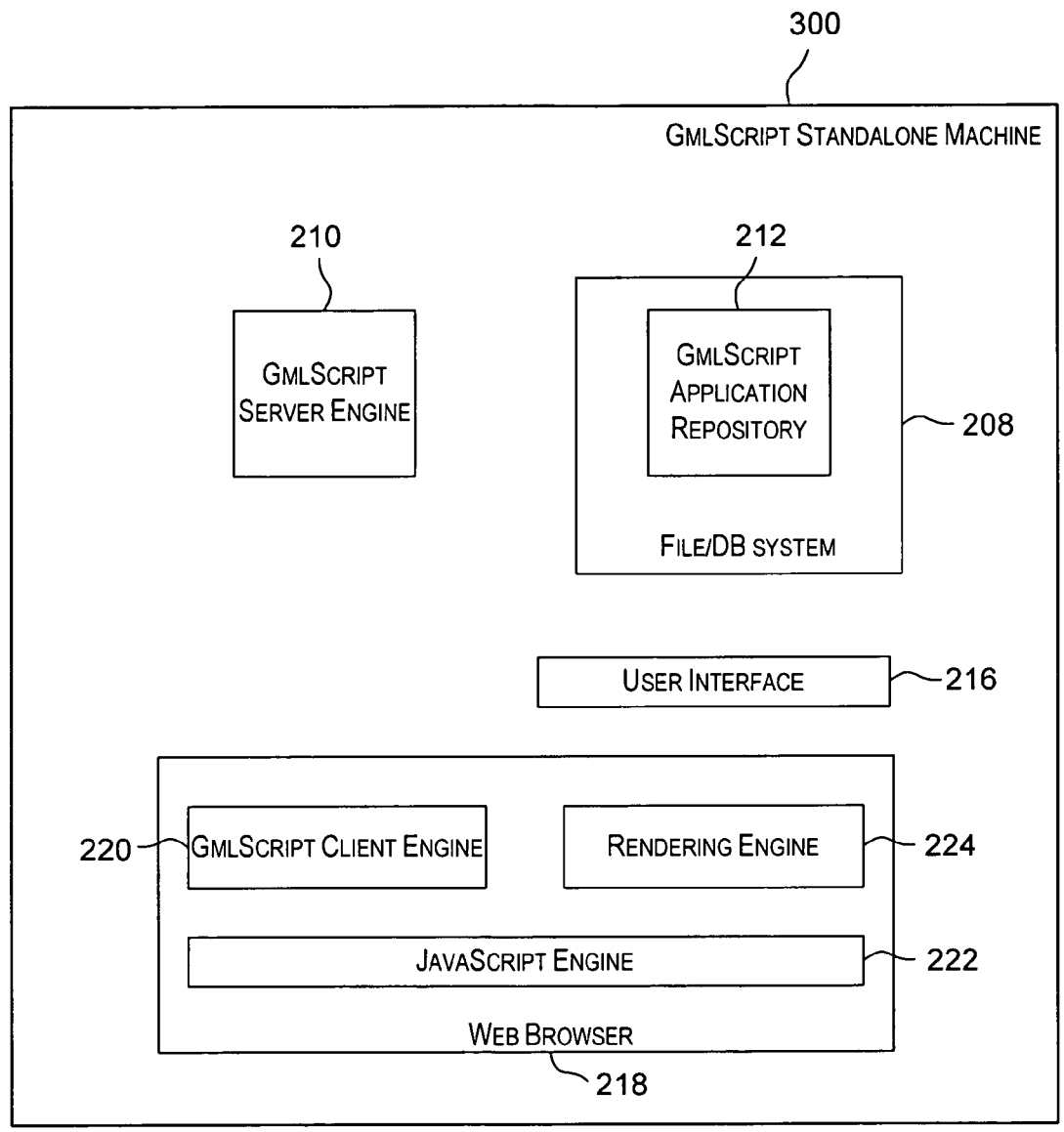
FIG. 3 is a simplified block diagram showing components of a standalone machine that hosts both a GmlScript server and a GmlScript client according to an embodiment of the present invention.

As previously indicated, embodiments of the present invention may be practiced in a network environment or in a standalone environment (e.g., a machine not connected to any network, or a machine that is operating in "offline" mode). FIG. 3 is a simplified block diagram showing components of a standalone machine 300 that hosts both a GmlScript server and a GmlScript client according to an embodiment of the present invention. The components depicted in FIG. 3 are similar to those depicted in FIG. 2. However, since this is operating in standalone mode, components that facilitate communication between a client machine and a server machine are not needed. Machine 300 depicted in FIG. 3 acts both as a client machine and a server machine.

Figure 4:
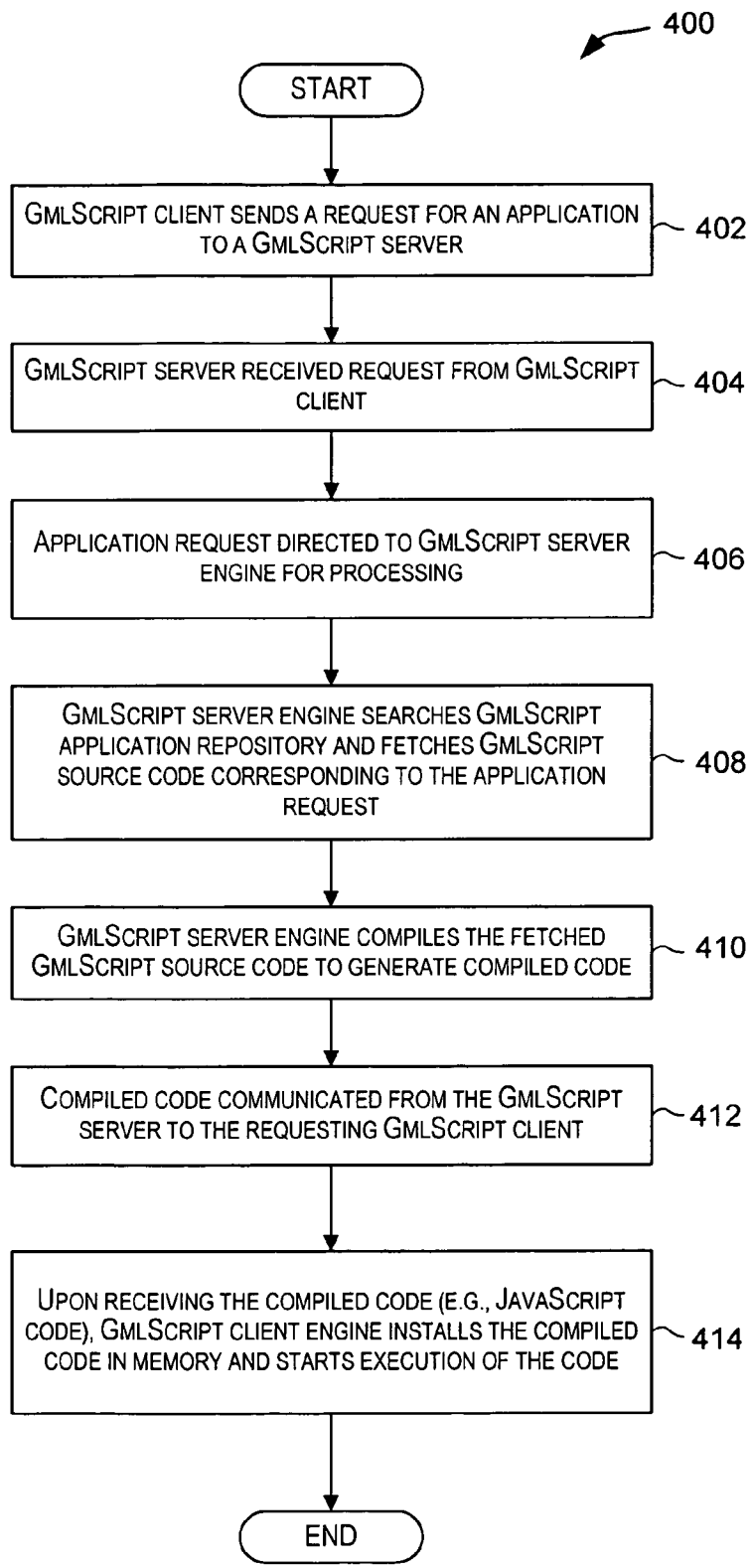
FIG. 4 depicts a simplified high level flowchart showing processing performed by a GmlScript client and a GmlScript server according to an embodiment of the present invention.

FIG. 4 depicts a simplified high level flowchart 400 showing processing performed by a GmlScript client and a GmlScript server according to an embodiment of the present invention. The GmlScript client and server may be executing on the same machine or on different machines coupled via a communication network. As depicted in FIG. 4, processing is initiated when GmlScript client (GmlScript client engine 220) initiates and sends a request for an application to a GmlScript server (step 402). For example, GmlScript client engine 220 may execute a program, such as a modeling framework, that initiates a request for a GmlScript application.

The request for an application may be a request for source code or portion thereof for an application, a request for one or more source files related to the application, or a request for a portion of an application or the entire application. In one embodiment, the request for an application may identify one or more source files requested for the application. For example, the source files may be requested using logical URNs (which are translated to physical URLs by the GmlScript server). In a network embodiment, the request may be communicated from GmlScript client engine 220 via client network interface 214 to a GmlScript server machine 110. The client request is received by a GmlScript server (step 404). In a network embodiment, the request for the application is received by network interface 204 of GmlScript server machine 110. The request is forwarded to GmlScript server engine 210 for processing (step 406). In one embodiment, the request is intercepted by web server 206, which then redirects it to GmlScript server engine 210.

GmlScript server engine 210 is configured to search GmlScript application repository 212 and fetch GmlScript source code corresponding to the application request (step 408). The fetched source code may contained in one or more source files. As part of 408, GmlScript server engine 210 is configured to determine one or more source file comprising the source code for the request. The requested source files may be determined based upon information contained in the request. For example, in one embodiment, the request received by the server in 402 may identify the one or more source files that are requested. In one embodiment, a source file identified in the request may result in multiple source files being fetched.

GmlScript server engine 210 is configured to compile the fetched GmlScript source code to generate a compiled source code (step 410). In one embodiment, the GmlScript source code is compiled into JavaScript code. For example, a GmlScript source code file (*.gs file) is compiled to generate a corresponding JavaScript source code file (a *.js file). In alternative embodiments, the GmlScript source code may be compiled to other languages that are capable of being executed by client-side application programs such as a web browser.

In one embodiment, prior to the compilation, the fetched GmlScript source code may be preprocessed and one or more pragmas in the source code may be replaced with corresponding pragma outputs. The results of the preprocessing may then be compiled according to step 410.

The compiled code is then communicated from the GmlScript server to the requesting GmlScript client (step 412). Upon receiving the compiled code (e.g., JavaScript code), GmlScript client engine 220 is configured to install the compiled code in memory and start execution of the compiled code (step 414). For example, the compiled code may be executed by a modeling framework. In one embodiment, a JavaScript engine may be used for the execution. The compiled code may be executed within a browser or some other client-side program. As part of 414, rendering engine 224 may be used for rendering the GmlScript application on user interface 216. In embodiments where the compiled code is in a different language, different language-specific engines that are capable of executing that language may be used to execute the compiled application code.

Figure 5:
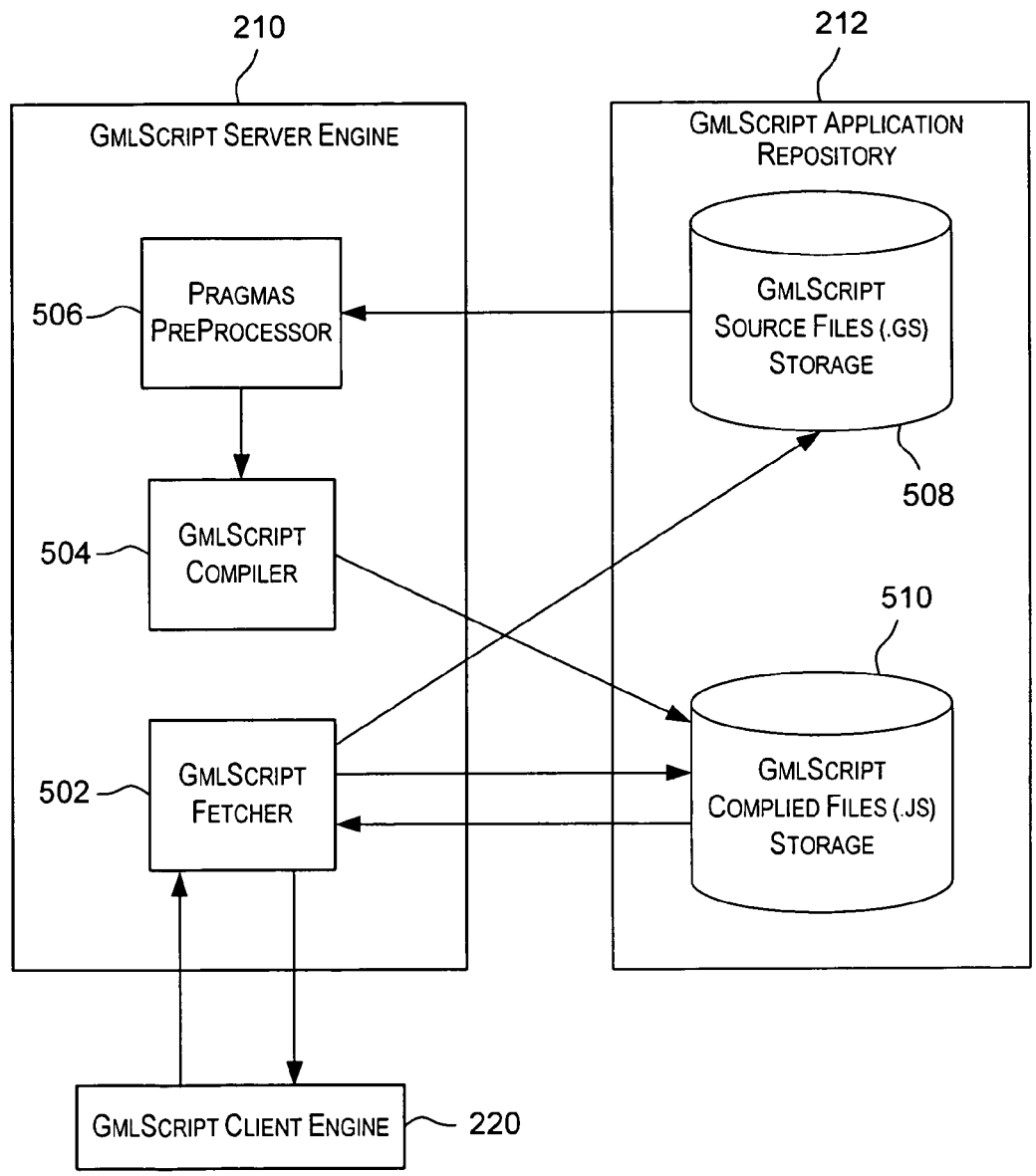
FIG. 5 is a simplified block diagram of a processing flow that takes places inside a GmlScript server according to an embodiment of the present invention.

FIG. 5 is a simplified block diagram of a processing flow that takes places inside a GmlScript server according to an embodiment of the present invention. The components depicted in FIG. 5 are merely illustrative of an embodiment incorporating the present invention and are not intended to limit the scope of the invention as recited in the claims. One of ordinary skill in the art would recognize other variations, modifications, and alternatives. The components depicted in FIG. 5 may be implemented in hardware, software (e.g., software code or modules executed by a processor), or combinations thereof.

As depicted in FIG. 5, GmlScript server engine 210 (from FIG. 2) comprises a GmlScript fetcher 502, a GmlScript compiler 504, and a GmlScript preprocessor 506. GmlScript application repository 212 (from FIG. 2) comprises two storage areas: a storage area 508 for storing GmlScript source files (*.gs files), and a cache or storage area 510 for storing compiled files (e.g., JavaScript *.js files) corresponding to the GmlScript source files. The arrows depicted in FIG. 5 show processing flows performed by the components.

Upon receiving an application request from a GmlScript client (e.g., from GmlScript client engine 220), the request is redirected to GmlScript fetcher 502 (indicated by the arrow from client engine 220 to fetcher 502 in FIG. 5). Fetcher 502 is configured to fetch source code for the request. The source code may be contained in one or more source files. Accordingly, fetcher 502 is configured to fetch one or more source files for the request. In one embodiment, the request may identify the one or more requested source files, In other embodiments, fetcher 502 may be configured to determine the source files for a request.

For example, the request may identify a GmlScript program.gs file. Fetcher 502 is configured to first check source files storage 508 for the existence of the requested source file program.gs (indicated by arrow from GmlScript fetcher 502 to storage 508). Fetcher 502 is also configured to check cache 510 for the existence of a compiled file (a "program.js" file) corresponding to source code file program.gs (indicated by the arrow from fetcher 502 to storage 510).

If fetcher 502 determines that the requested source file program.gs does not exist in storage 508, then an exception is raised and the request is terminated unsuccessfully. Otherwise, if fetcher 502 determines that a compiled file program.js corresponding to the program.gs file exists in storage 510 and its date/time stamp is not older than date/time stamp of the source program.gs file in storage 508, the compiled file (program.js) is fetched and returned to the requesting GmlScript client (as shown by the arrows storage 510 to fetcher 502 and from fetcher 502 to GmlScript client engine 220). If fetcher 502 determines, either that the compiled file (program.js) does not exist in storage 510, or that it exists but is older than the source file (program.gs) in storage 508, then it indicates that source file (program.gs) in storage 508 has to be compiled (or recompiled).

In one embodiment, compilation of a GmlScript source code file is carried out in two steps. First, the GmlScript source file program.gs is passed through GmlScript preprocessor 506 (indicated by arrow from storage 508 to preprocessor 506), which parses any pragma directives embedded in the GmlScript source code and replaces them with corresponding pragma outputs. For example, in one embodiment, all documentation comments are stripped, relative URLs are converted to absolute URLs, text symbols are replaced with translated text resources for the current user, server variables are replaced with their current values, etc.

The results of the preprocessing performed by preprocessor 506 are then passed through to GmlScript compiler 504 (indicated by the arrow from preprocessor 506 to compiler 504). In one embodiment, GmlScript compiler 504 is configured to read the GmlScript code from the program file and generate corresponding JavaScript code. In other embodiments, GmlScript compiler 504 may generate code in some other language that is capable of being executed by a client-side application. In one embodiment, the generated JavaScript code comprises embedded metadata that provides runtime information about the underlying GmlScript application. This metadata may be used by GmlScript client engine 220 to support code introspection and debugging in GmlScript. If any errors are encountered during the compilation process, an exception is raised and the request is terminated unsuccessfully.

If compilation is successful, then the generated compiled file is saved in storage 510 (indicated by the arrow from compiler 504 to storage or cache 510). For example, the output resulting from the compilation of GmlScript code file program.gs is saved in storage or cache 510 as file program.js. The compiled file (program.js) is then returned by fetcher 502 from storage 510 to the requesting GmlScript client as a response to the request received from the client (indicated by the arrows from storage 510 to fetcher 502 and from fetcher 502 to GmlScript client engine 220).

The processing described above assumes that a GmlScript source code file is compiled to a JavaScript file. However, in alternative embodiments, a GmlScript source code file may be compiled to other languages that are capable of being executed by client-side application programs such as a browser or some other application. Accordingly, the use of JavaScript as the compiled-to language is not intended to limit the scope of the present invention as recited in the claims. Further, embodiments of the present invention are not restricted to execution within a browser, other client-side applications may also be capable of executing the compiled source code.

FIG. 6 depicts an example GmlScript source file (core.gml2:gui.elements.Interactor.gs) before it is passed as input to GmlScript compiler 504 according to an embodiment of the present invention.

FIG. 7 depicts an example of a JavaScript compiled file (core.gml2:gui.elements.Interactor.js) generated by GmlScript compiler 504 according to an embodiment of the present invention. The compiled file shown in FIG. 7 was generated from the GmlScript source file depicted in FIG. 6.

Figure 8:
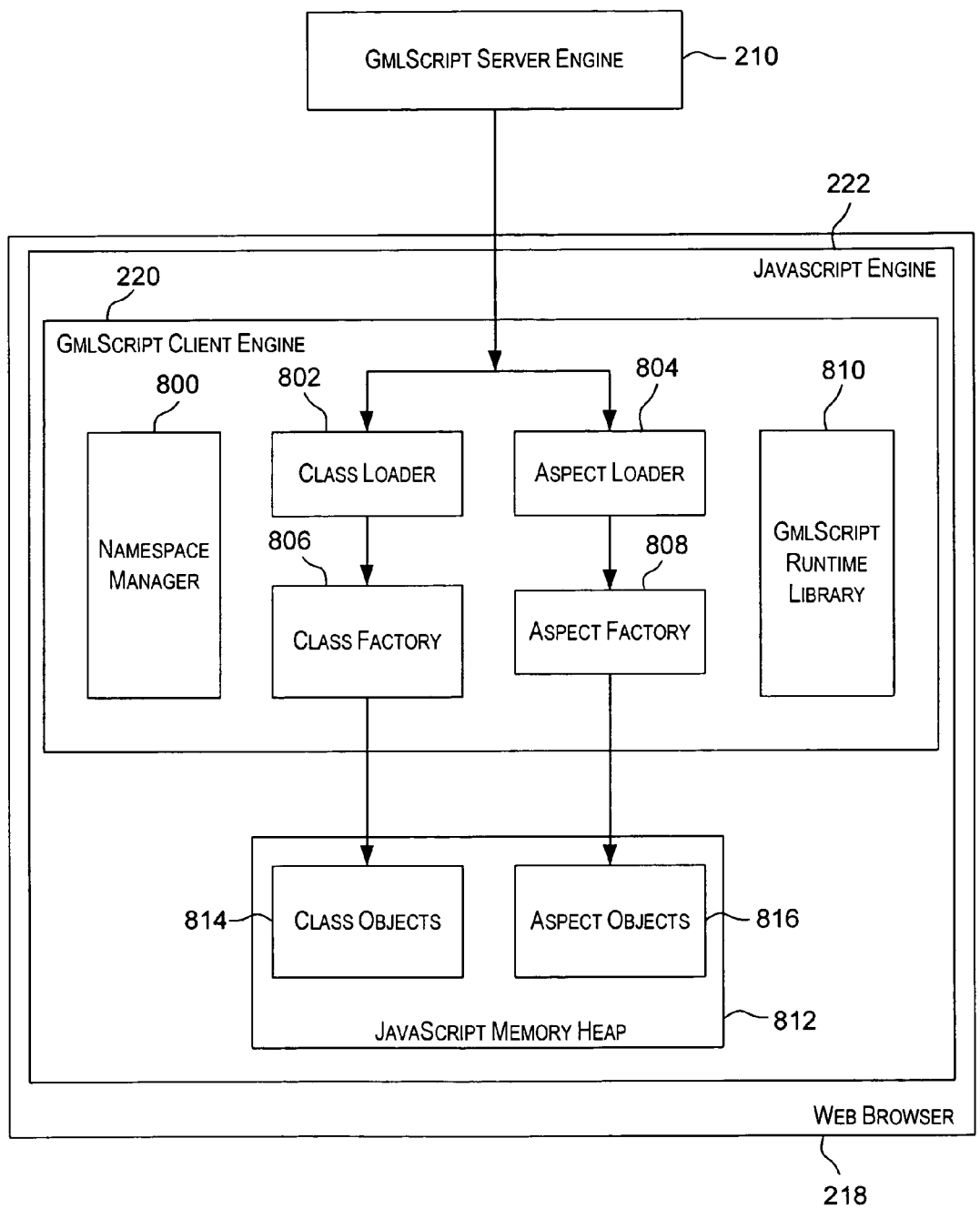
FIG. 8 is a simplified diagram showing a processing flow that takes places inside a GmlScript client according to an embodiment of the present invention.

FIG. 8 is a simplified diagram showing a processing flow that takes places inside a GmlScript client according to an embodiment of the present invention. The components depicted in FIG. 8 are merely illustrative of an embodiment incorporating the present invention and are not intended to limit the scope of the invention as recited in the claims. One of ordinary skill in the art would recognize other variations, modifications, and alternatives. The components depicted in FIG. 8 may be implemented in hardware, software (e.g., software code or modules executed by a processor), or combinations thereof.

As depicted in FIG. 8, GmlScript client engine 220 comprises a namespace manager 800, a class loader 802, an aspect loader 804, a class factory 806, an aspect factory 808, and a GmlScript runtime library 810. In one embodiment, GmlScript client engine 220 is written in JavaScript and is executed by JavaScript engine 222 that runs within a web browser 218.

In one embodiment, in the GmlScript language there are two primary kinds of program files: GmlScript class files and GmlScript aspect files. Class loader 802 is responsible for loading GmlScript classes from GmlScript server engine 210. Class loader 802 is also responsible for loading class interface files and class prototype files. Aspect loader 804 is responsible for loading GmlScript aspects from GmlScript server engine 210. In one embodiment, the files loaded by either class loader 802 or aspect loader 804 are compiled JavaScript files generated from source GmlScript files, as previously described. In alternative embodiments, the files may be of other types or languages that can be executed within a browser or other client-side software.

Class factory 806 is responsible for installing classes, interfaces, and prototypes loaded by class loader 802 inside the global namespace of JavaScript engine 222. Aspect factory 808 is responsible for installing aspects loaded by aspect loader 804 inside the global namespace of JavaScript engine 222.

JavaScript engine 222 has a single global namespace. Therefore, namespace manager 800 is used for implementing the GmlScript namespace mechanism. The namespace manager partitions the global JavaScript namespace into individual partitions for each loaded GmlScript namespace. The GmlScript classes, interfaces, prototypes, and aspects that are loaded are installed into their respective namespaces within the global JavaScript namespace.

Class factory 806 is also responsible for instantiating GmlScript classes. In one embodiment, the GmlScript class objects are created inside JavaScript memory heap 812 in a designated class objects area 814. Aspect factory 808 is responsible for instantiating GmlScript aspect objects. The GmlScript aspect objects are created inside JavaScript memory heap 812 in a designated aspect objects area 816.

Once the GmlScript classes/aspects have been loaded and installed, the GmlScript application compiled source code starts executing, creating GmlScript objects as needed, invoking methods, raising events, etc. In one embodiment, both kinds of GmlScript objects (class instances and aspect instances) are regular JavaScript objects with some additional GmlScript metadata. Thus, any GmlScript object can directly reference any JavaScript object, and vice versa. Once a GmlScript object is created, it behaves as a regular JavaScript object and its execution is governed by the standard JavaScript execution rules.

A GmlScript application is rendered within user interface 216 window (depicted in FIG. 2) that is associated with web browser 218 in which the GmlScript application is hosted. While the example in FIG. 8 shows a GmlScript client with a single web browser 218, a GmlScript application is not limited to a single web browser window. In alternative embodiments, a GmlScript application may be executed in multiple web browser windows, as depicted in FIG. 9.

Figure 9:
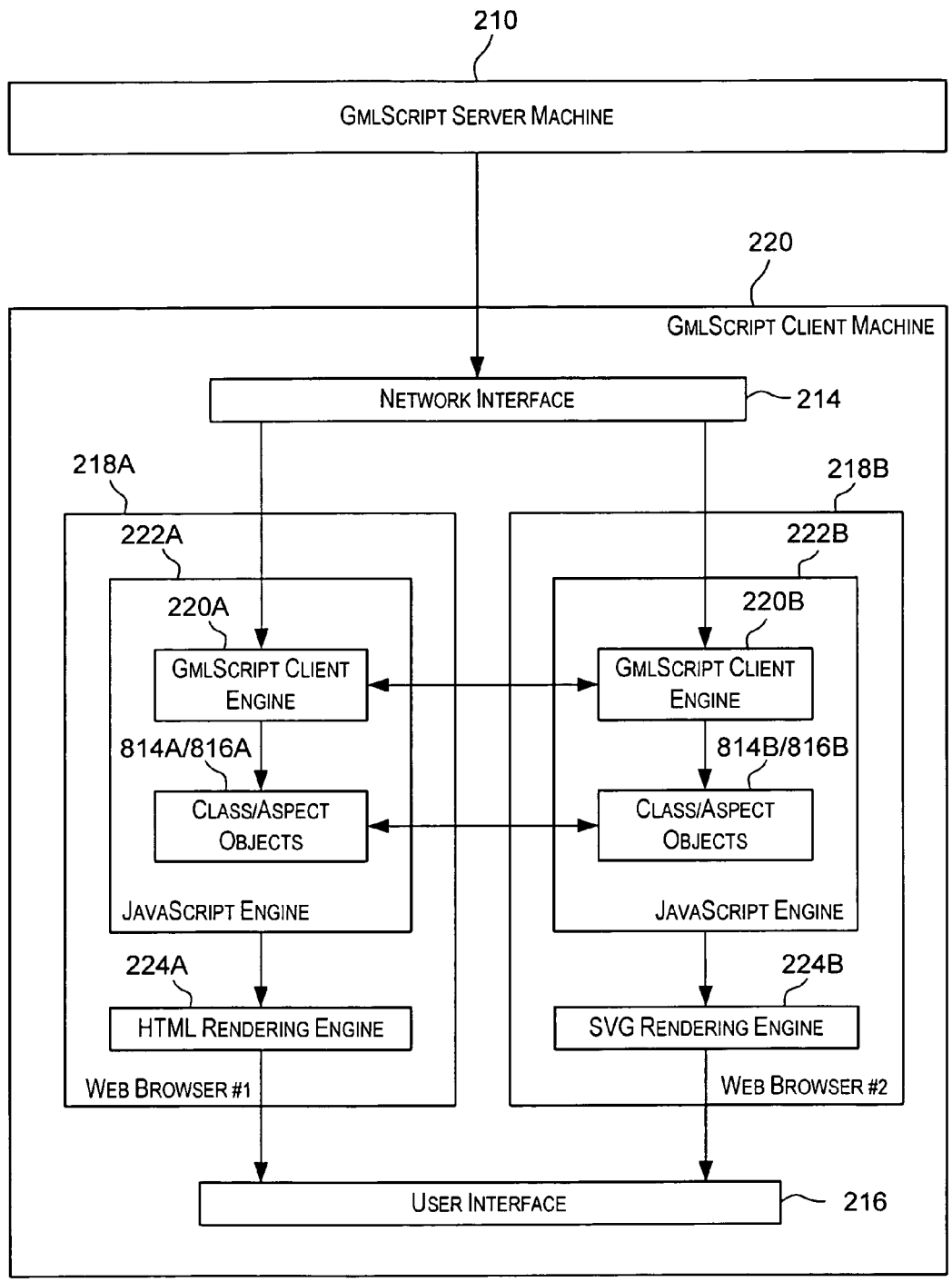
FIG. 9 illustrates a scenario in which a GmlScript application is executing in multiple browser windows according to an embodiment of the present invention.

FIG. 9 illustrates a scenario in which a GmlScript application is executing in multiple browser windows according to an embodiment of the present invention. Initially, a first web browser 218A is opened and the GmlScript application is loaded and executed within it by GmlScript client engine 220A. As depicted in FIG. 9, web browser 218A comprises an Hypertext Markup Language (HTML) rendering engine 224A and thus the GmlScript application will be rendered in HTML inside web browser 218A window.

At some point during execution, the first GmlScript application executing in web browser 218A may open a second web browser 218B and load a second GmlScript application into it. The second GmlScript application is loaded and executed by GmlScript client engine 220B within second web browser 218B window. In FIG. 9, web browser 218B comprises a scalable vector graphics (SVG) rendering engine 224B and thus the GmlScript application will be rendered in SVG inside web browser 218B window.

GmlScript client engines 220A and 220B may use various different techniques to communicate with each other. In one embodiment, GmlScript client engines 220A and 220B may communicate directly using JavaScript method invocations. This is shown by the arrow between 220A and 220B. Also, GmlScript objects 814A/816A created by the first GmlScript client may reference any GmlScript objects 814B/816B created by the second GmlScript client, and vice versa. This is shown by the arrow between 814A/816A and 814B/816B.

The example depicted in FIG. 9 and described above shows how a GmlScript application may be executed in multiple browser windows using different rendering technologies (HTML and SVG are shown in this example, but any other supported rendering technology may be used). The separate windows can communicate with each other and pass information objects enabling the creation of rich and highly interactive web applications with the GmlScript language.

The clients that initiate GmlScript application requests may themselves be written in GmlScript. For example, the SAP Visual Composer modeling tool is an example of a commercial application written in GmlScript. Visual Composer takes advantage of the GmlScript language and architecture to create a visual modeling and simulation tool with multiple windows and WYSIWYG editing that can be run from within any browser on the web without requiring installation.

As described above, applications may be written in GmlScript language and stored on a GmlScript server. One or more of the applications may be requested by a GmlScript client. Source code corresponding to the requested application is then compiled to a language, such as JavaScript, that can be executed inside a web browser environment. The compiled code is then communicated to the GmlScript client, which may then execute the application within a browser or other client-side program capable of hosting a GmlScript client. In this manner, GmlScript provides a language for writing web applications that can executed by a client program that may be hosted by a client-side software such as a browser. The client program may be a modeling framework such as Visual Composer. These applications can be executed on a client machine (or standalone machine).

In one embodiment, GmlScript provides support for object-oriented programming. GmlScript presents an object-oriented programming model, that enables developers to access, manipulate, and extend the underlying application model programmatically. GmlScript supports client-side scripting and enables programs to be loaded into the browser on demand, without installation of any special software on the client-side (such as compilers, interpreters, virtual machines, etc). GmlScript supports self-contained components (kits) and supports distributed development and evolution of program units across separate development teams. The concepts of componentization and namespaces are built into GmlScript. GmlScript also supports aspect-oriented programming. GmlScript provides an adequate aspect-oriented solution for implementing modeling aspects that cut across the boundaries of class hierarchies. GmlScript also provides support for namespaces, classes, methods, and properties, prototypes for multiple inheritance, events and listeners for implementing dynamics and constraints, transactions for ensuring model consistency and for undo/redo, objects persistency, dynamic loading, introspection, self documentation, and preprocessing pragmas.

In one embodiment, GmlScript is an extension to JavaScript and provides several features that are missing in JavaScript. GmlScript statements provide the declarative skeleton while the code itself may be written in pure JavaScript. Parts of JavaScript may be used, for example, parts of JavaScript that have the same syntax as in Java (if, for, while, switch). Browser-specific details such as dynamic HTML (DHTML), cascading style sheets (CSS), SVG, etc. are hidden from the developer. As previously described, in one embodiment, GmlScript is preprocessed and compiled into JavaScript. Any syntax or declaration errors are detected and reported at this stage. Given a well-designed set of core GmlScript classes and aspects, useful GmlScript code can be automatically generated from metamodel information alone.

The following section describes some of the features of GmlScript that enable development of rich web applications according to an embodiment of the present invention that may be used in conjunction with a modeling tool such as SAP Visual Composer. The features described below are not intended to limit the scope of the invention as recited in the claims.

Language Structure

GmlScript promotes software design in the form of self-contained and self-describing packages of functionality, also known as "kits". GmlScript kits are organized around application or feature areas (e.g., ESA, WDP, UR, ODP, GDP, etc.). Kits present a programming model with properties, methods, and events. Kits have attributes that provide declarative information and incorporate their own documentation. Kits are organized into namespaces. Use of namespaces avoids the possibility of name collisions between kits developed by different teams.

A GmlScript kit consists of one or more declaration units. In one embodiment, there are four types of declaration units in GmlScript: (1) Class; (2) Aspect; (3) Prototype; and (4) Configuration. Each declaration unit is stored in a separate source file. GmlScript source files have the .gs extension. Each source file has a logical urn which is mapped to a physical modeling tool (e.g., Visual Composer) package resource. For example,

URL[core.gml:elements.Scenario.gs]

Declaration unit files are imported in order of dependencies.

A declaration unit is made of one or more declaration members. In one embodiment, there are nine types of declaration members in GmlScript. FIG. 10 lists a set of declaration members and the corresponding declaration units according to an embodiment of the present invention.

Declaration members may contain code blocks, which, in one embodiment are written in JavaScript. A JavaScript Block consists of a list of JavaScript statements placed in the member's body (e.g., between the member's header and the end keyword, or the next member). Examples of JavaScript statements that are used include declaration statements (e.g., using var to declare local variables), expression statements (expressions such as i++, A+B<C, etc.), selection statements (e.g., if, switch), iteration statements (e.g., for, while, do), jump statements (e.g., break, continue, return), exception statements (e.g., try, catch, throw).

Function statements are provided by GmlScript. In one embodiment, function statements create inner functions that are only accessible within the scope of the containing JavaScript block. In one embodiment, there are no global functions in GmlScript.

In one embodiment, GmlScript is not case-sensitive, but the JavaScript blocks are case-sensitive. Various editors may be used for writing GmlScript including but not restricted to TextPad editor (which is used by many programmers and provides GmlScript syntax highlighting and source clips files), Eclipse Editor (used by the WebDynPro community) that includes a custom GmlScript editor, with syntax highlighting and intellisense.

Documentation is automatically generated from GmlScript source files. A full-fledged documentation viewer may be provided as part of the SDK tools that facilitate the development and testing of GmlScript kits.

Classes

Syntax:

class-declaration:
    Class class-name class-header members-list class-header:
    inherit class-name; 0 . . . 1
    implement proto-name; 0 . . . n
    attach aspect-name; 0 . . . n
    attach aspect-name override object-literal; 0 . . . n class-name:
    qualified-identifier In one embodiment, a class is the fundamental declaration unit in GmlScript. A class is a data structure that combines data (properties) and behavior (methods and other function members) in a single unit. A class provides a definition for dynamically created instances of the class, also known as objects. Classes support inheritance and polymorphism, mechanisms whereby derived classes can extend and specialize base classes. Accordingly, classes may be arranged in hierarchies such that a class member lower in the hierarchy inherits behavior from its parent or superclass or classes. An example of a base class and a derived class, according to an embodiment of the present invention, are depicted in FIG. 11.

Figure 12:
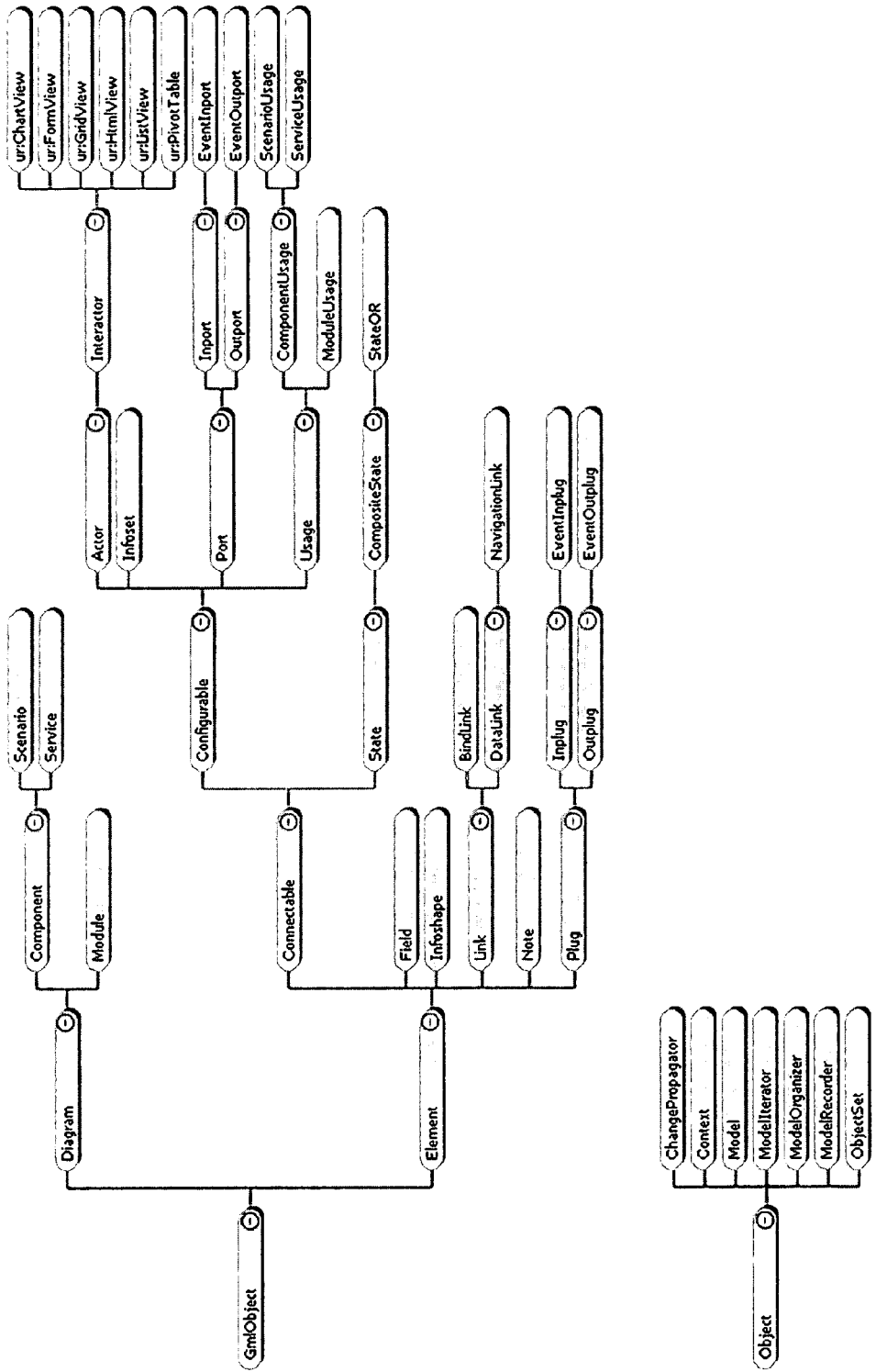
FIG. 12 depicts a sample class hierarchy derived from Object and GmlObject according to an embodiment of the present invention.

In one embodiment, GmlScript classes are inherited either from "Object" or "GmlObject". Object is the ultimate superclass of all transient objects. Instances of Object or any of its derived classes only exist in memory. A class is derived from Object when a helper class is needed. GmlObject is the ultimate superclass of all persistent model objects. Instances of GmlObject or any of its derived classes are stored as part of the model and are universally accessible. A class is derived from GmlObject when you need to represent a new model element. There is a one-to-one correspondence between the tree of classes derived from the GmlObject (aka, the GML-DOM) and the underlying application modeling language. FIG. 12 depicts a sample class hierarchy derived from Object and GmlObject according to an embodiment of the present invention.

In one embodiment, instantiations of classes derived from Object are created using the createObject API, for example:
   var tree=$ENV.createObject('core.env:GkbFoldersProvider', $ENV.channel2, 'ALL');
The above statement allocates memory for a new instance of class env:GkbFoldersProvider, invokes a constructor to initialize the instance with two parameters ($ENV.channel2 and 'ALL'), and returns a reference to the instance which is assigned to variable tree. The memory occupied by an object is automatically reclaimed when the object is no longer in use. In one embodiment, it is neither necessary nor possible (in one embodiment) to explicitly deallocate objects in GmlScript.

In one embodiment, instances of GmlObject are never created directly. Instead, various available factory methods are used for creating new model elements. For example:

| | |
|---|---|
| var model = | $ENV.model; |
| var diag = | model.createDiagram('core.gml:Scenario', {name:'My Scenario'}); |
| var port = | diag.createElement('core.gml:Inport'); |

The above statements create a new diagram and a new element in the active model. Consequently, the corresponding GmlObject instances will be automatically created and their references will be returned. The GmlObject instances are deallocated when the model is closed. They are automatically reallocated when the model is opened again. The exact point in time in which the GmlObject instances are allocated or deallocated depends on the implementation of the GMLDOM classes. GmlObject instances and their internal state persist across multiple sessions. Instances of GmlObject may thus persist after the end of a program that created or used the instances. The persistence is carried out behind the scenes, in a manner completely transparent to the GmlScript user (e.g., developer). The GmlObject instances are reclaimed only when the elements they represent are removed from the model.

GmlScript supports inheritance. In one embodiment, single inheritance is supported for classes (multiple inheritance is supported for Prototypes, explicit override resolves name conflicts that can occur when a class inherits multiple prototypes.). Multiple inheritance may be supported in other embodiments. Inheritance implies that a class implicitly contains all members of its base class. Inheritance is transitive such that if C is derived from B, and B is derived from A, then C inherits the members declared in B as well as the members declared in A. A derived class can add new members to those it inherits, but it cannot remove the definition of an inherited member. A is a method (or an ISA macro) is provided to test whether an object is an instance of a specified class, or of any of its derived classes.

GmlScript supports overriding of inherited members. A derived class cannot implicitly hide inherited properties and methods. The override keyword is used for explicitly overriding inherited properties and methods. The sealed modifier is used to prevent a derived class from further overriding a property or a method. A sealed member is implicitly also an overridden member. In one embodiment, metadata, constructors, and destructors are always implicitly overridden. Events and transactions are always implicitly sealed. The supercall method is used to invoke an overridden method on the most immediate base class on which the method is defined. A protocall method is used to invoke an overridden method on a specific base class (or on an inherited prototype).

As kits and classes evolve over time, implicit members hiding can lead to subtle bugs. This is due to a problem known as fragile base classes. Base classes are termed fragile when adding new features to a base class leads to breaking existing derived classes. In GmlScript, a compile-time error is raised for such situations at compile-time.

GmlScript supports polymorphism. In object-oriented programming, polymorphism refers to a programming language's ability to process objects differently depending on their data type or class. Polymorphism enables different class types to respond to a message with type-specific methods. In GmlScript, an implicit conversion exists from a class type to any of its base class types. Therefore, a variable of a class type can reference an instance of that class or an instance of any derived class.

Various different documentation conventions may be used. In one embodiment, the scope attribute of the documentation tags is used to define the member accessibility (public, protected, or private). Members tagged as private are hidden in the generated documentation. This documentation convention helps establishes some measure of declared accessibility.

Figure 14A:
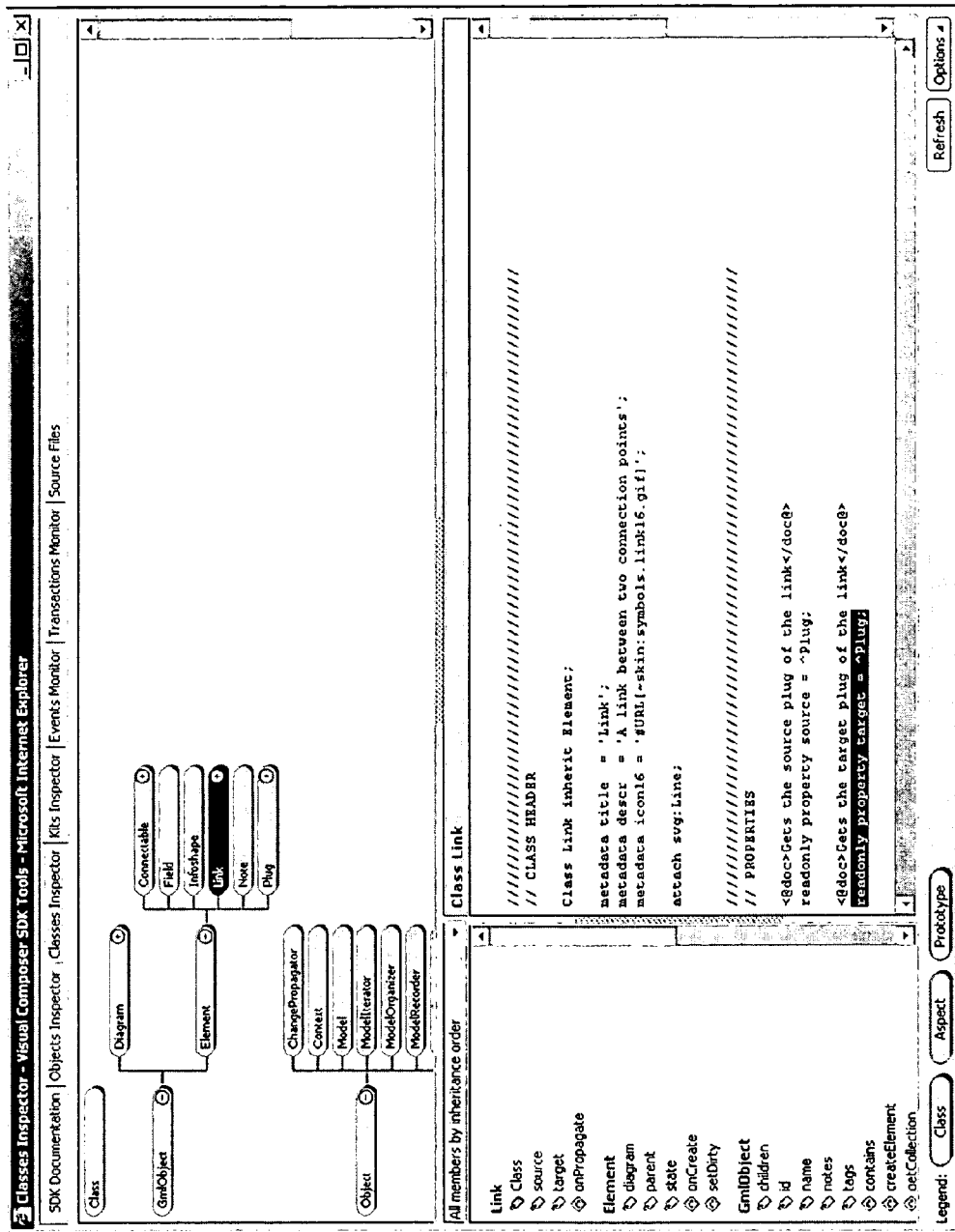
FIGS. 14A, 14B, and 14C depict examples of SDK tools that make use of introspection capabilities according to an embodiment of the present invention.
Figure 14B:
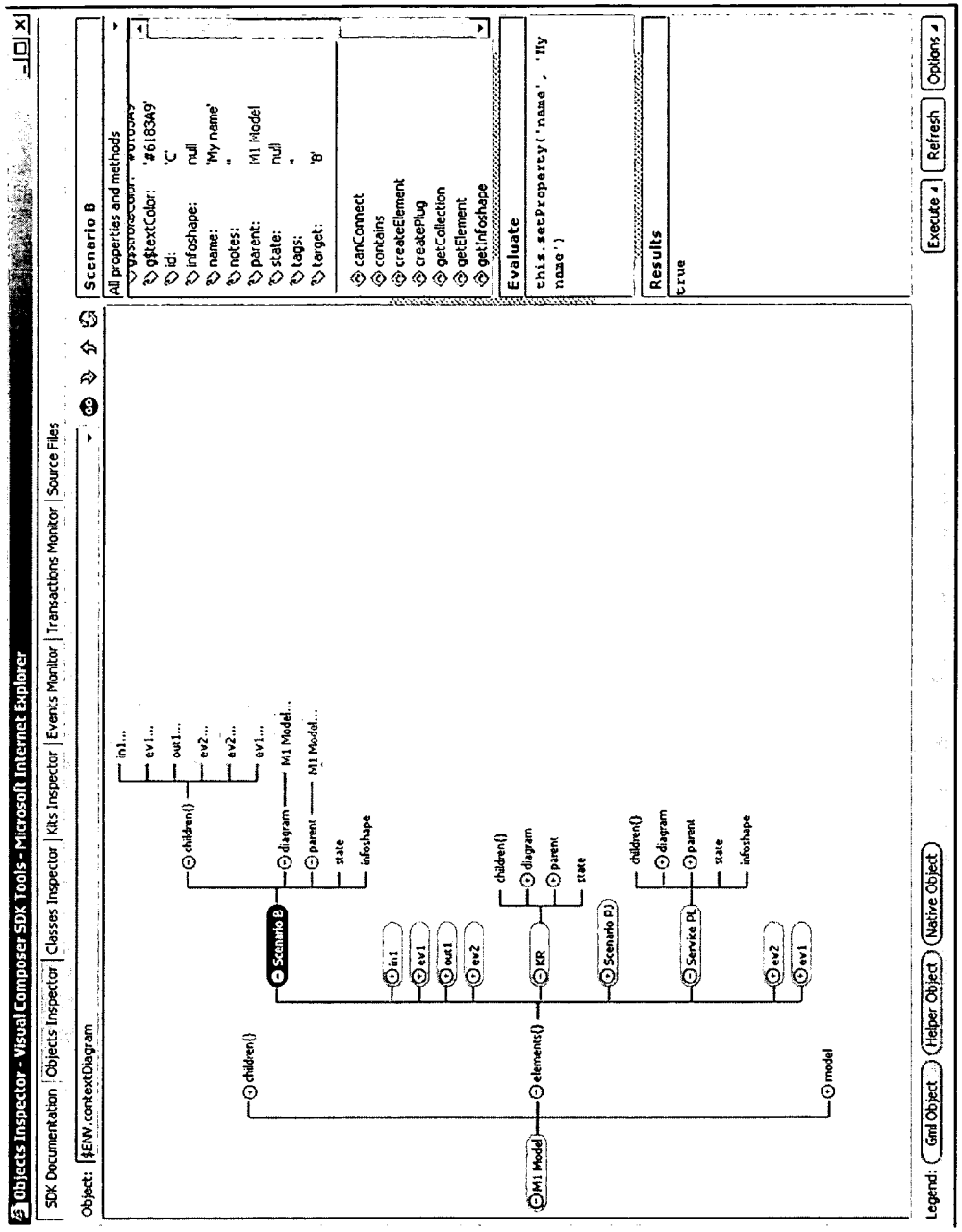
Figure 14C:
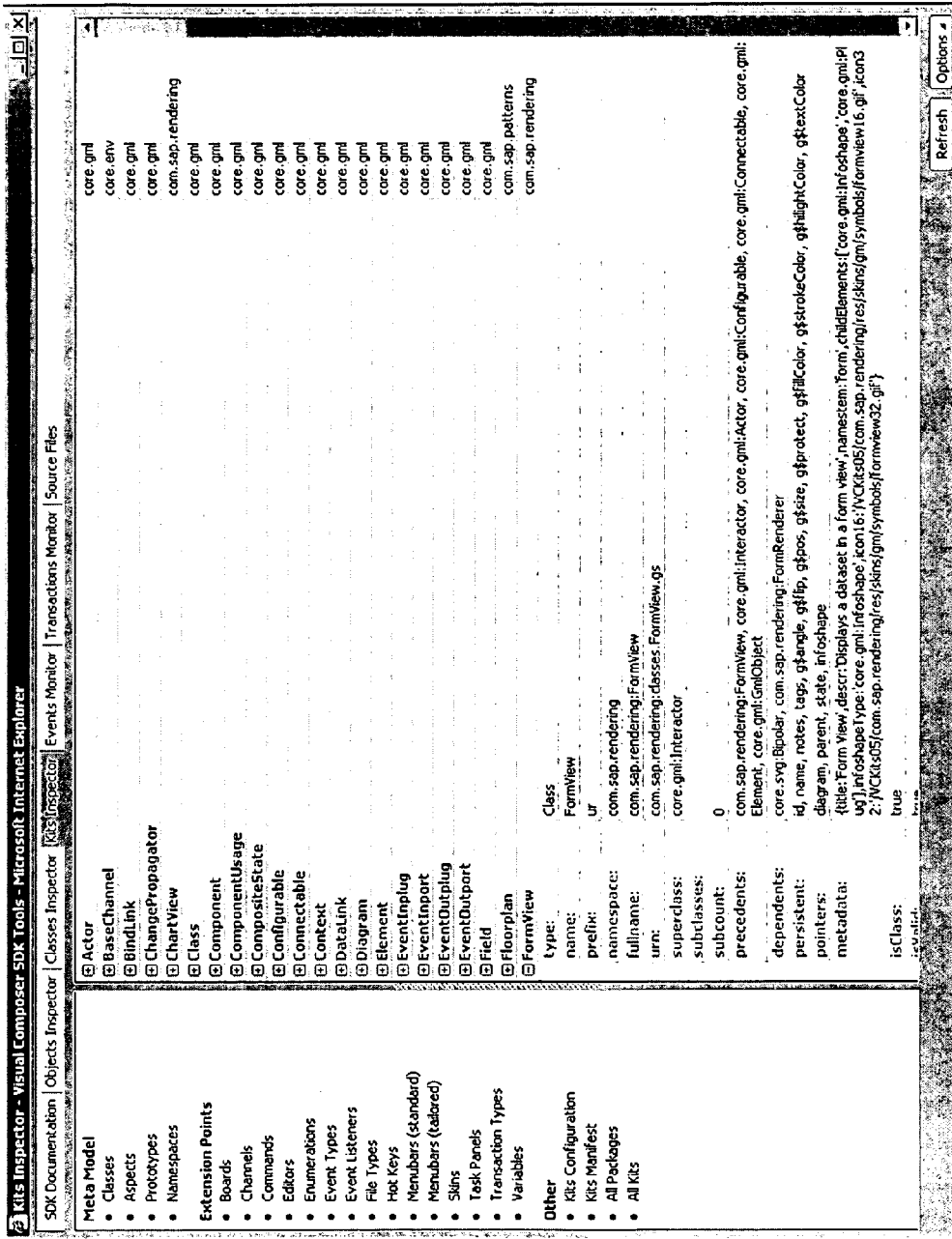

GmlScript supports introspection. Introspection is a capability to determine the type of an object at runtime. A special class Class is provided that represents class metadata information. Each instance of Class is an object that describes a GmlScript class. A special property Class on an object instance is used to get the Class instance that represents its class. FIG. 13 depicts an example of use of property Class that enables introspection according to an embodiment of the present invention. Various APIs are provided that may be used to introspect the GmlScript classes that are installed in memory. FIGS. 14A, 14B, and 14C depict examples of SDK tools that make use of introspection capabilities according to an embodiment of the present invention.

Properties

---

Syntax:
property-declaration:
   property-modifier property identifier = initializer
property-modifier:
   (override | sealed)$_{opt}$ (static | virtual)$_{opt}$ readonly$_{opt}$
initializer:
   simple-literal         // string, numeric, or boolean literals
   compound-literal   // object or array literals (readonly properties)
   ^class-name        // object pointer(instance properties)
   ^class-name [ ]     // objects vector(instance properties)
   ^class-name [key-name]   // objects collection (instance properties)

---

A property is a variable that is associated with a class or with an instance of a class. The static, virtual, and readonly modifiers control the property's access and storage. The override and sealed modifiers allow overriding properties, as explained in the Classes section. The property initializer serves two purposes: it provides an initial value for the property, and it implicitly defines the property's data type.

A property may be initialized to various values including simple literals
   e.g., property name=' ';
   e.g., property size=0;
   e.g., property valid=false,
compound literals
   e.g., readonly property primes=[1,3,5,7];
   e.g., readonly property style={color:'#FF9933', font:'normal 11 tahoma', cursor:'hand'};

pointer e.g., property diagram=^Diagram;

vector e.g., property columns=^Column[ ];

collection e.g., property elements=^Element[id];

In one embodiment, there are no uninitialized properties in GmlScript. All properties in GmlScript are initialized using Object instance initializers, GmlObject instance initializers, or Static initializers.

Object instance initializers: When an Object is instantiated, all its property values are set to their initial values before the constructor is invoked. Pointers, vectors, and collections are set to the empty pointer, empty vector, and empty collection, respectively.

GmlObject instance initializers: When a GmlObject is first created, all its property values are set to their initial values before the on Create callback is invoked. Pointers, vectors, and collections are set to the empty pointer, empty vector, and empty collection, respectively. By convention, factory methods that create GmlObjects accept as a parameter a property values bag. These property values will override the initial values of their respective properties, before the onCreate callback is invoked. Subsequently, whenever an existing GmlObject is read from storage, and before the onLoad callback is invoked, all the persistent properties are set to the stored values, if any. Virtual properties, and persistent properties without a stored value, will be left with their initial values.

Static initializers: Static initializers provide the initial values for class properties when the class is installed.

Property data types: According to an embodiment, GmlScript properties are typed. The data type of a property is defined according to the data type of its initializer. After the initialization step is completed, a property holds a value in its declared type. The property accessors accept and return property values in their declared types. When persistent properties are serialized/deserialized, type conversion is automatically carried out. In one embodiment, the property data types are also published in the generated documentation. When GmlObjects are persisted, their property values are validated against their declared types. Invalid property values are rejected, and will not appear in the persistent form of the model.

In contrast to GmlScript, JavaScript is not a typed language and thus it is possible to change the data type of values stored in properties within the JavaScript blocks. There is no mechanism to enforce strict type checking for JavaScript objects in memory.

Property Accessors: In GmlScript, methods are provided for getting and setting property values. For example, the getProperty and setProperty methods may be used to get and set property values, respectively. It is also valid to get property values directly, using the dot (.) notation. However, it is not valid to set property values directly, since such updates will not trigger corresponding notification events. As an exception to this rule, it is allowed to set property values directly for virtual or readonly properties within their owner object.

EXAMPLES

```
var name = element.getProperty('name');   // get name property
element.setProperty('name', 'my name');   // set name property
```

```
var name = element.name;                  //get name property
element.name = 'my name';                 // invalid
```

Techniques are also provided for iterating over property values. The JavaScript array iterator may be used to iterate over array and vector properties. The JavaScript object iterator may be used to iterate over object and collection properties.

Class and instance properties: A property declared without the static modifier becomes an instance property. An instance property creates a separate storage location for each instance. Modification of the value of an instance property in one instance has no effect on the value of that same property in any of the other instances.

A property declared with the static modifier becomes a class property. A class property identifies exactly one storage location. No matter how many instances of a class are created, there is only ever one copy of a static property. Modification of the value of a class property in one instance is immediately reflected in all of the other instances.

Virtual and persistent properties: In one embodiment, GmlObject properties are persistent by default. A GmlObject property declared without the virtual modifier becomes a persistent property. Its value is automatically saved and read together with the owner object. A GmlObject property declared with the virtual modifier becomes a virtual property. Its value is not stored, and the property is reset to its initial value whenever the owner object is read. Virtual properties on GmlObjects are mostly used for optimizations.

Object properties are virtual by default. An Object property is always virtual, regardless of the existence of the virtual modifier. Virtual properties only exist in memory.

Readonly properties: A property declared with the readonly modifier becomes a readonly property. A readonly property cannot be modified using the setProperty method. Readonly properties are typically initialized during object creation. Readonly properties can be modified at later stage by the owner object, by directly setting their value using the dot (.) notation.

Metadata declaration: A metadata is a readonly attribute that is associated with a class.

```
Syntax:
    metadata-declaration:
        metadata identifier = initializer
    initializer:
        simple-literal        // string, numeric, or boolean literals
        compound-literal      // object or array literals
```

A metadata resembles an override static readonly property. The main difference is that a class metadata can be accessed directly, without requiring an instance reference. A metadata always implicitly overrides an inherited metadata with the same name. Metadata members are typically used to provide declarative information about the class. FIG. 15 depicts a metadata declaration example according to an embodiment of the present invention.

Methods

Syntax:

method-declaration:

method-modifier method identifier parameters$_{opt}$javascript-block method-modifier:

(override|sealed)$_{opt}$ parameters:

(identifier$_{list}$)

( )

javascript-block:

javascript-statement javascript-block; javascript-statement javascript-block end A GmlScript method is a member that implements a computation or action that can be performed by an object. The method body consists of a (possibly empty) JavaScript block. The method body extends until the end keyword, the next method declaration, or the end of the source file, whichever comes first. The override and sealed modifiers allow overriding methods, as explained in the Classes section. The this keyword is used to reference the object instance within the method body.

Formal Parameters: The method declaration has a (possibly empty) parameters list that defines its formal parameters. Within the method body, the formal parameters may be referenced using their simple names. When a method is invoked the actual parameters are assigned to the formal parameters according to:

Simple types (string, number, Boolean, and pointer) are passed by value.

Complex types (array, object, vector, and collection) are passed by reference.

It is possible to invoke a method with any set of actual parameters, not necessarily matching the formal parameters. the arguments keyword, the typeof operator, or the ISA macro is used to examine the actual list of parameters that were passed. This may be used to implement method overloading. FIG. 16 depicts an example of method overloading according to an embodiment of the present invention. The data types of the method's parameters are not declared, but can be documented using the documentation tags.

Return Value: Formally, a method always returns a single value. When no actual value is returned, the formal returned value is the special JavaScript undefined value. The data type of the returned value is not declared, but can be documented using the documentation tags. The data type of the returned value may vary between different invocations of the method.

Constructors: A constructor is a special method that implements the actions required to initialize an instance of an Object or an Aspect.

Syntax:

constructor-declaration:

constructor parameters$_{opt}$javascript-block

FIG. 17 depicts an example of a GmlScript constructor according to an embodiment of the present invention. FIG. 18 depicts an example of invoking a constructor according to an embodiment of the present invention.

In one embodiment, constructors are not supported on GmlObjects. This is due to the fact that GmlObjects are persistent objects, and thus have a more intricate life cycle than normal objects. During its lifespan, a GmlObject is constructed and reconstructed on different circumstances. To avoid confusion, explicit construction callback methods are used to implement the required initialization actions at each stage, as follows:

| Callback | Description |
| --- | --- |
| onCreate | Invoked immediately after an object has been created by a factory method, but before it is inserted into the model, and before any notification events are raised. Override this method to create or update dependant model objects, as needed. By default, this callback method does nothing. |
| onLoad | Invoked each time an object is loaded to memory from the model repository (this can happen at most once during a work session). Override this method to create or update dependant model objects, as needed. It is guaranteed that when this method is invoked, all other objects in the same diagram unit have been loaded and can be safely referenced. This may not be true for objects in other diagrams, which can still be off memory at this stage. By default, this callback method does nothing. |
| onClone | Invoked immediately after an object has been copied by a cloning method, but before it is inserted into the model, and before any notification events are raised. By default, this callback method copies all properties and clones all children. |

Destructor: A destructor is a special method that implements the actions required to reclaim any resources taken by an Aspect instance.

Syntax:

destructor-declaration:

destructor javascript-block

In one embodiment, destructors are not supported for classes, they have meaning only for aspects. FIG. 19 depicts an example of a destructor according to an embodiment of the present invention.

Events

Syntax:

event-declaration:

event identifier parameters$_{opt}$ parameters:

(identifier$_{list}$)

( )

GmlScript supports events. An event is a member that enables an object or an aspect to provide notifications. Clients can attach executable code for events by supplying event listeners. The event declaration has a (possibly empty) parameters list that defines its formal parameters. The actual parameters will be sent to all listeners of the event when the event is fired. By convention, most events define a parameter named object which references the object that has triggered the event. In one embodiment, events are implicitly sealed and cannot be overridden on derived classes.

Figure 22:
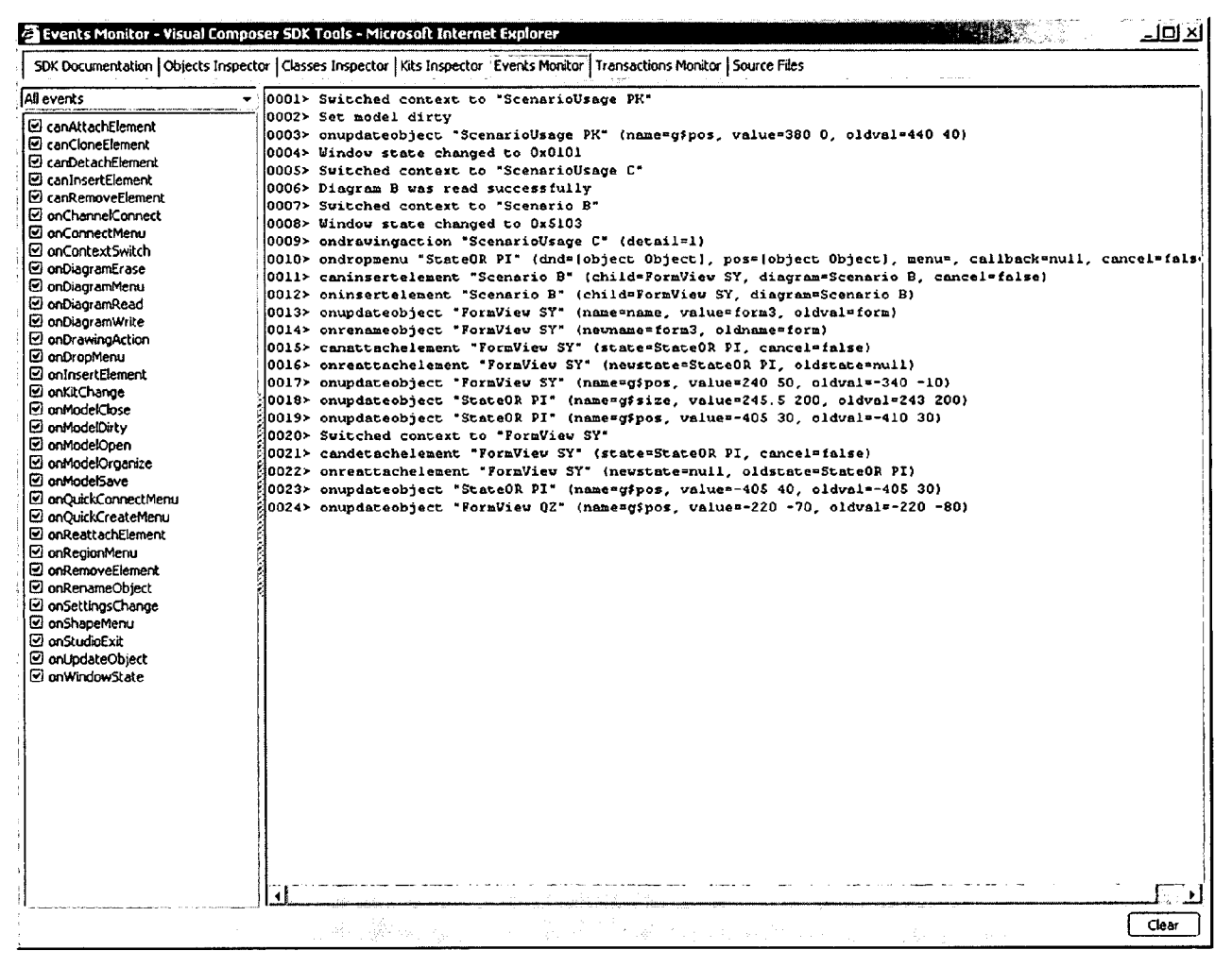

Firing Events: An event is raised by using the createEventObject to create an event object, filling it with the actual parameter values, and then using the fireModelEvent method to the fire the event. FIG. 20 depicts an example of declaring an event according to an embodiment of the present invention. FIG. 21 depicts an example of firing an event according to an embodiment of the present invention. Various SDK tools may be provided for monitoring events. One such tool is depicted in FIG. 22.

Listener: In embodiment of GmlScript, a listener is a JavaScript block that is invoked whenever its registered event is fired.

Figure 23:
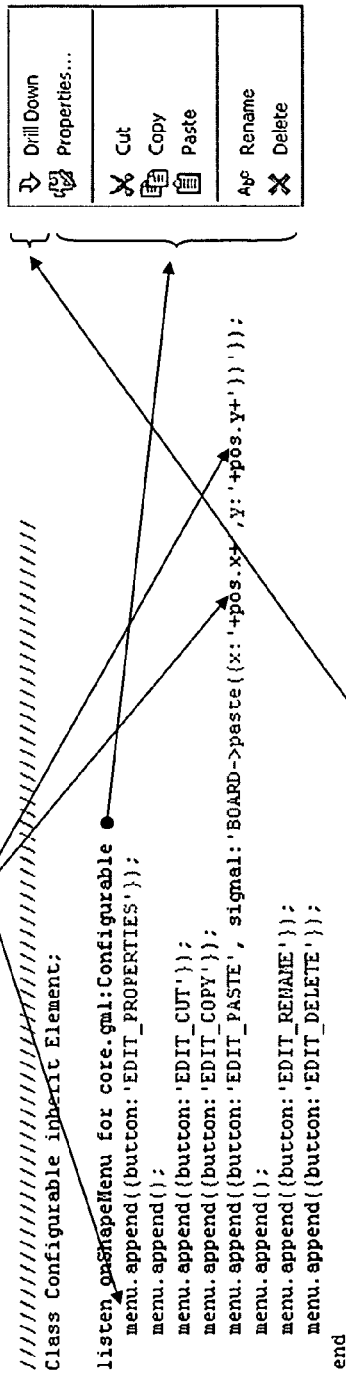
FIG. 23 depicts a context menu listener example according to an embodiment of the present invention.

Syntax:

listener-declaration:

listen identifier javascript-block listen identifier for class-name javascript-block The for keyword may be used to filter a listener by the class of the event's source object. Within an event listener, the event parameters may be referenced directly by their simple names. As a rule, an event listener declared on a base class is always invoked before an event listener declared on a class derived from that base class. The invocation order of event listeners that are defined on sibling classes is implementation dependent. FIG. 23 depicts a context menu listener example according to an embodiment of the present invention. FIG. 24 depicts a drag n' drop listener example according to an embodiment of the present invention.

In one embodiment, listeners may be classified as global or local. A global event listener is a listener that is always active in the global execution context of the Storyboard environment. A local listener is a listener that is active only within the execution context of its containing window. Local listeners may be used to create specific event handlers for custom editors, task panes, dialog boxes, etc. A LISTEN macro is provided for creating local event listeners. FIG. 25 depicts an example of a local listener according to an embodiment of the present invention.

Aspects

In object-oriented programming, the natural unit of modularity is the class. GmlScript introduces aspects, which encapsulate behaviors that affect multiple classes into reusable modules. Aspects in GmlScript grew out of a recognition that typical modeling concerns often do not fit naturally into a single class, or even several closely related classes. Typical modeling concerns that cut across class divisions include: mapping a canonic model representation to one or more visual representations (drawing boards); mapping a canonic model representation to one or more GUI standards (layout boards); enforcing a set of design-time constraints on the model; checking a model for logic errors; simulating the execution of a model; compiling a model into executable code for different target platforms; generating documentation for the model in different formats; analyzing usability measurements of the model; and persisting a model into various formats. Without an adequate aspect-oriented solution these modeling aspects would have been difficult to understand, implement, and change.

An aspect is a special kind of class that can be attached to one or more regular classes. Aspects, like regular classes, support single inheritance in one embodiment.

Syntax:

aspect-declaration:
  Aspect role aspect-role: properties-prefix$_{opt}$
  Aspect aspect-name for aspect-role aspect-header members-list aspect-header:
  inherit aspect-name; 0 . . . 1
  attach class-name; 0 . . . n
  attach class-name override object-literal; 0 . . . n aspect-role:
  qualified-identifier aspect-name:
  qualified-identifier Aspect Role: The root aspect at the top of any hierarchy of derived aspects is called the aspect role. The aspect role is a pure abstract aspect that cannot contain any members.

Aspect Instance: An aspect instance is an object that is attached to exactly one instance of the attached class. The aspect instance is also called the aspect object, and the instance of the attached class is also called the base object. The aspect object executes in a separate execution context and its properties are stored in a separate namespace.

Direction of attachments: Class→Aspect, Aspect→Class

Class→Aspect: Use case: A new kind of interactor class needs to be added to the model, but we want to reuse the existing GmlDrawing resp. GmlDoc aspects to avoid implementing the code for drawing the new interactor resp. generate its documentation.

Aspect—Class: Use case: An entirely new aspect role is introduced for generating code to a new target platform. The new aspect role needs to be applied over all the already existing classes.

Use case: It is desired to change the way certain specific model elements are drawn. Therefore, it is needed to reattach a different GmlDrawing for the respective classes.

Cardinality of attachments: An aspect may be attached to one or more classes. A class can be attached to one or more aspects. In one embodiment, it is not allowed to attach two or more aspects that are derived from the same aspect role to the same class.

Figure 26:
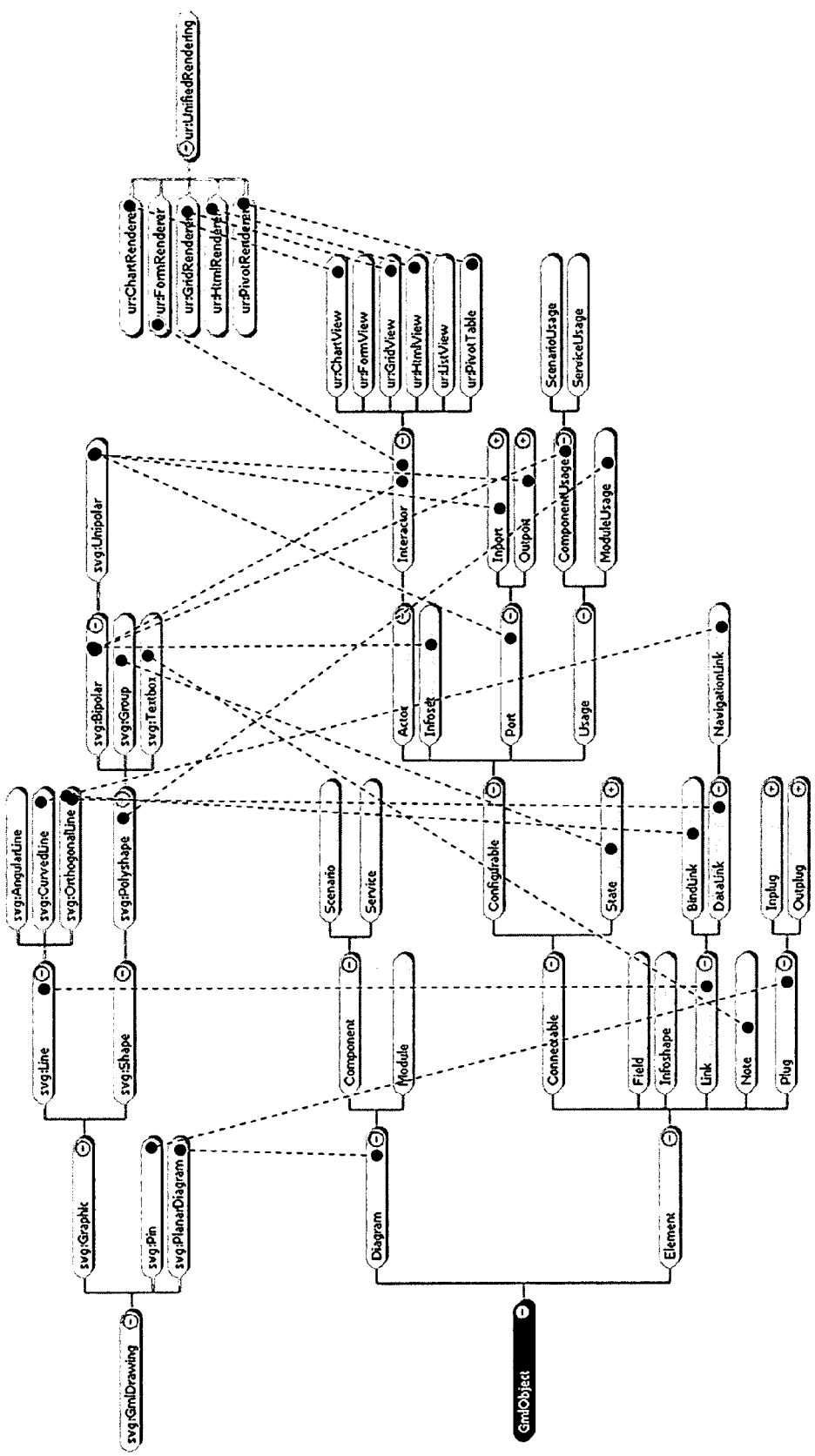
FIG. 26 depicts a pictorial example of attaching aspects to classes derived from GmlObject according to an embodiment of the present invention.

Inheritance of attachments: All aspects attached to a class are implicitly attached also its derived classes. An attached aspect may be overridden by another aspect on derived classes, so long as both aspects are derived from the same aspect role. It is also possible to override individual properties of attached aspects by using the override keyword. FIG. 26 depicts a pictorial example of attaching aspects to classes derived from GmlObject according to an embodiment of the present invention. FIG. 27 depicts an example of attaching aspects to classes according to an embodiment of the present invention.

Within an aspect method, the this keyword may be used to reference the aspect object and the base keyword may be used to reference the base object. Virtual and non-virtual properties and methods may be defined using the virtual keyword. Use of the virtual keyword in one embodiment has the effect depicted in the following table:

| Modifier | Property | Method |
| --- | --- | --- |
| Virtual | Stored on the aspect object | base refers to base object this refers to aspect object |
| Non-virtual | Stored on the base object | base and this refer to base object aspect object cannot be referenced |

Virtual and non-virtual properties: Virtual aspect properties are used for keeping the aspect's internal state. Non-virtual aspect properties are used for storing persistent aspect data on the base object (they are stored their own separate namespace).

Virtual and non-virtual methods: Virtual methods are executed in the aspect's execution context. Non-virtual methods are executed in the base object's execution context.

Figure 28:
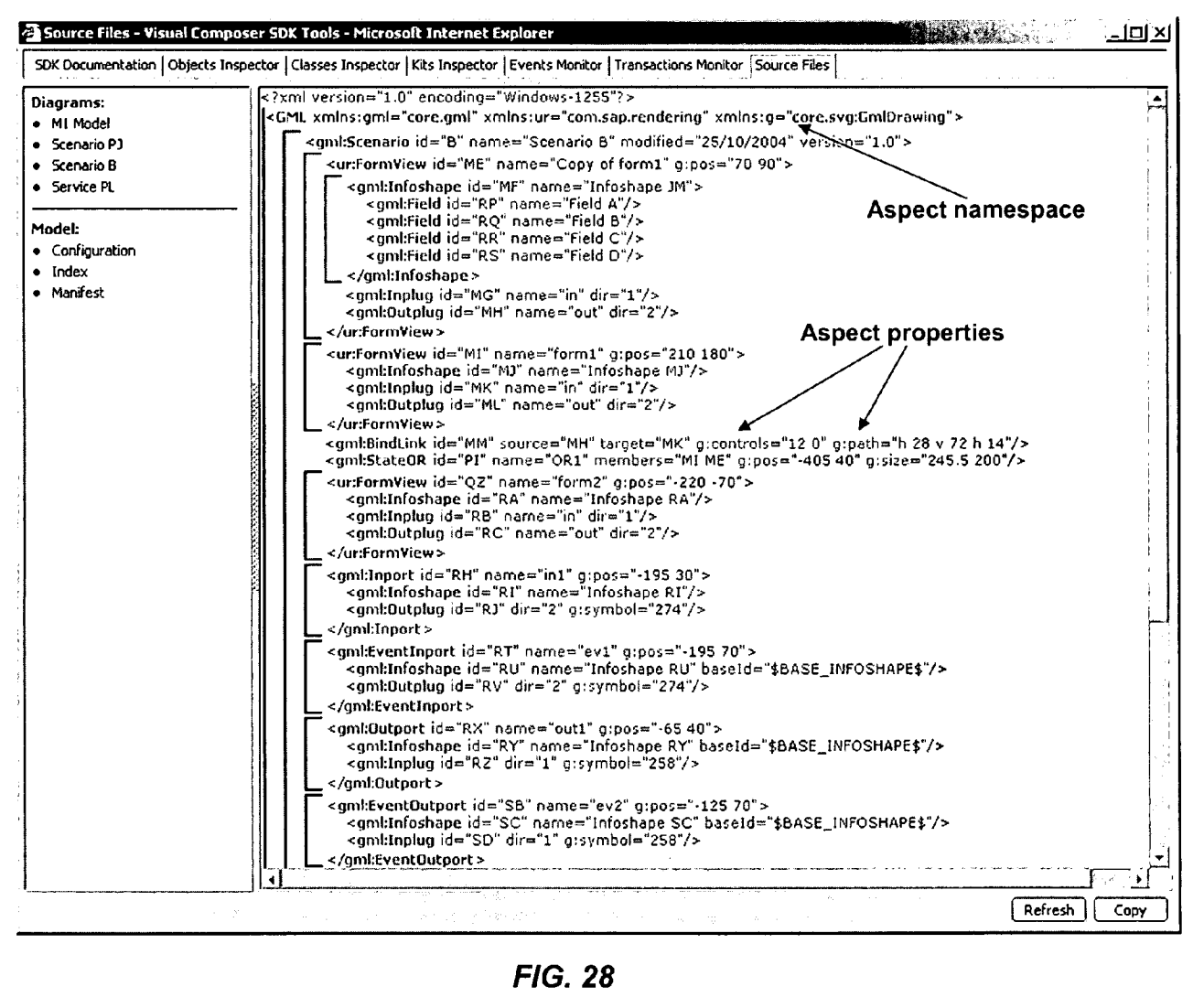

FIG. 28 depicts an example of aspect persistence according to an embodiment of the present invention.

Transactions

Syntax:

transaction-declaration:
  transaction identifier parameters$_{opt}$javascript-block parameters:
  (identifier$_{list}$)
  ( )

javascript-block:
  javascript-statement
  javascript-block; javascript-statement
  javascript-block end GmlScript supports transactions. A transaction is a member that can be used to encapsulate and record object updates. Transactions ensure consistency of the model after updates.

Transactions are also used for enabling undo/redo functionality. In one embodiment, the transaction body consists of a JavaScript block with labeled statements. The JavaScript statements in this block may be labeled with the special do, undo, or redo labels to indicate the transaction phase they apply to. When a transaction is executed, a corresponding object containing the transaction parameters is created and stored in the transactions buffer. The transaction parameters may be referenced within the transaction body using their simple names. FIG. 29 depicts an example of a transaction according to an embodiment of the present invention.

Nested transactions: A transactions recording is a sequence of one or more transactions that are undone or redone in a single scope. Multiple updates may be enclosed in a single transaction recording using the BEGIN and COMMIT macros. To abort an ongoing transaction recording, a ROLLBACK macro is used. Transactions may be nested to any number of levels, but care must be taken that the BEGIN and COMMIT calls are balanced exactly. Nested transactions are merged, so at most a single transaction recording is active at any time. FIG. 30 depicts an example of a nested transaction according to an embodiment of the present invention.

Several tools may be provided for monitoring transactions. FIG. 31 depicts an example of a tool for monitoring transactions according to an embodiment of the present invention.

Prototypes
Syntax:
prototype-declaration:
    Prototype proto-name proto-header members-list
proto-header:
    inherit proto-name; 0 . . . 1
proto-name:
    qualified-identifier In GmlScript, a prototype is a special kind of abstract class that cannot be instantiated. GmlScript allows classes to inherit any number of prototypes, in addition to their base class. A prototype may, in turn, inherit any number of other prototypes. A prototype may contain partial implementation code. A prototype without any implementation code is equivalent to an interface declaration. An empty prototype without any members is equivalent to a stereotype declaration.

Prototypes provide a controlled form of multiple inheritance as depicted by the example in FIG. 32. If the same member is inherited from different prototypes and/or the base class, then the member should be overridden on the derived class (or prototype) to resolve the ambiguity. The isa method is provided to test whether an object is an instance of a specified prototype. The protocall method should be used, instead of the supercall method, to invoke an overridden method on a base prototype.

Configuration Sections
Syntax:
configuration-section:
    Configure extension-point$_{list}$ javascript-block
extension-point:
    identifier In an embodiment of GmlScript, a configuration section is a global JavaScript (or some other language in alternative embodiments) block that is executed during the configuration time of a modeling tool (e.g., during the Visual Composer Storyboard's configuration time, for example, after all kits have been installed, but before the work session is started).

In Visual Composer, the various published Storyboard environment APIs (part of the core.env package) may be used to configure different Storyboard extension points, such as commands, menus, toolbars, palettes, hotkeys, etc. The Storyboard extension points that are affected by the configuration section are explicitly named using the extension point names (listed in the table below), to ensure that the configuration changes take effect. For code readability and maintainability, it is also allowed to embed configuration section declarations within other declaration units such as Class or Aspect. The following table lists the available Storyboard extension points according to an embodiment of the present invention.

| Extension Point | Description |
| --- | --- |
| * | All section types |
| BOARDS | Design boards (core.env:kitBoards) |
| CHANNELS | Communication channels (core.env:kitChannels) |
| COMMANDS | UI commands (core.env:kitCommands) |
| EDITORS | Editor declarations (core.env:kitEditors) |
| ENUMERATIONS | Enumerations (core.env:kitEnumerations) |
| FILETYPES | Registered file types (core.env:kitFiletypes) |
| HELPERS | Helper objects (core.env:kitHelpers) |
| HOTKEYS | Keyboard hotkeys (core.env:kitHotkeys) |
| LISTENERS | Event listeners (core.env:kitEvents) |
| MENUBARS | Menubars and toolbars (core.env:kitMenubars) |
| SKINS | Skins (core.env:kitSkins) |
| TASKPANELS | Task panels and task groups (core.env:kitTaskpanels) |
| TRANSACTIONS | Transaction types (core.env:kitTransactions) |
| VARIABLES | System and user variables (core.env:kitVariables) |

FIG. 33 depicts an example of a commands configuration section according to an embodiment of the present invention. FIG. 34 depicts an example of a menubars configuration section according to an embodiment of the present invention.

Documentation Tags
Syntax:
<@tag attr$_1$="value$_1$" attr$_2$="value$_2$" . . . >
    documentation text
</tag@>

Modeling tools may provide a mechanism that allows developers to document their

GmlScript code. In one embodiment, SAP Visual Composer framework provides a mechanism for developers to document their code using special XML tags. In GmlScript resource files, blocks that begin with <@ and that end with @> are processed as special documentation comments. Documentation comments, just like regular JavaScript comments (/* . . . */) and HTML/XML comments (<!-- . . . -->) are skipped by the code preprocessor and have no effect on program execution. Documentation comments are distinguished from regular comments in that they are written using the special Visual Composer documentation tags. Because the documentation comments have a well-structured tagged format, they can be parsed by automated tools to generated formatted documentation, search indexes, intellisense data files, etc.

Auto documentation tag: Since documentation tags are intended for documenting any resource file (including .js, .htm, .htc, .css, .xml, .svg files), a relatively large set of documentation tags and attributes are provided (e.g., several documentation tags are defined in Visual Composer). In GmlScript source files (.gs) the documentation tags syntax may be simplified by using the special <@doc> documentation tag. The <@doc> tag is auto-completed according to context, requiring less detail to be entered manually and reducing the risk of documentation errors. To use the <@doc> tag, place it immediately before a valid GmlScript declaration, and it will be auto-completed according to the declaration's type. One may override any of auto-completed attributes by specifying them directly on the <@doc> tag. One may also embed any inner tags that are valid for the documentation tag that is generated from the <@doc>. For example,
  <@doc also="P2">First property<.doc@>
  static readonly property P1=100;
is equivalent to
  <@prop name="P1" type="number" default="100" scope="public" access="R0" static="yes" virtual="no" also="P2">
  First property
  </prop@>
  static readonly property P1=100;
FIG. 35 depicts a documentation example according to an embodiment of the present invention. Various tools may be provided for viewing the documentation. FIG. 36 depicts a tool for viewing documentation according to an embodiment of the present invention.

Preprocessor Pragmas

GmlScript supports several preprocessor pragmas. Pragmas provide a generic mechanism for eliminating dependencies on server-side platform details such as operating system, physical addressing scheme, hard-coded system/user data, file formats, system/user settings, etc. GmlScript pragmas use a syntax independent of any file format or programming language syntax and are transparent for resource consumers (e.g., clients such as a Storyboard client in Visual Composer).

According to an embodiment of GmlScript, a pragma is a special preprocessor instruction that can be used in any resource file (.js, .svg, .htm, .htc, .css, etc.), including also GmlScript files (.gs). Pragmas are processed on the GmlScript server whenever their containing resource file is requested by a client. Pragmas are processed before the GmlScript parser is invoked. Pragmas are processed and replaced by their respective results before a resource file reaches a requesting client.

In GmlScript, the general syntax for declaring a pragma as follows: pragma:
  #pragma [argument$_{opt}$]
In GmlScript files, pragmas are used to avoid dependencies on any server-side details, such as Examples pragmas used in GmlScript files are described below.

(1) #ALIAS pragma
Syntax: #ALIAS[prefix=namespace]
This pragma defines an alias (short prefix) for a fully qualified namespace name, or an aspect rolename. Aliases defined using this pragma may be used with the #URL or #ASPECT pragmas. In one embodiment, the built-in namespace aliases (dev, env, gkb, gml, and lib) cannot be overridden by this pragma. The alias is defined only within the contained resource file. This pragma is generally used when a resource file frequently references resources from other namespaces. Resources within the same namespace do not need to be qualified and thus do not typically require a namespace alias.
Example
Before:
  #ALIAS[ur=com.sap.rendering]
  . . .
  MODAL("#URL[ur: toolbarEditor.htm]")
After:
  MODAL("bin/fetcher.asp?urn=com.sap.rendering:toolbarEditor.htm")

(2) #ASPECT Pragma
syntax: #ASPECT[aspectRole:memberName] or @role: member
This pragma defines an aspect member name in a manner independent of the aspect rolename's prefix. The aspect role may be specified using either a fully qualified name, or using an prefix previously defined with the #ALIAS pragma. This pragma is generally used whenever you need to explicitly name aspect members. Since aspect rolename prefixes are allocated dynamically, this pragma provides a method for referencing aspect members explicitly.
Example
Before:
  #ALIAS[g=core.svg:GmlDrawing]
  . . .
  diagram.createElement("gml:Note", {"text":"Some remarks", "#ASPECT[g:bbox]":"10 10 100 50"})
After:
  diagram.createElement("gml:Note", {"text":"Some remarks", "svg$bbox":"10 10 100 50"})
In GmlScript files, the #ASPECT pragma may be written in a shortcut notation using the @ symbol:
@prefix:name is equivalent to #ASPECT[prefix:name]
The shortcut notation is generally used in GmlScript files to improve source code readability. Aspect prefixes may be used in this short form notation. Fully qualified aspect rolenames are not supported in the shortcut notation. If the GmlScript file is an Aspect class source file, then the aspect prefix may be omitted. In such a case, the aspect role in context will be assumed.
For example:
  Aspect BasicShape for core.svg:GmlDrawing
  #ALIAS[g=core.svg:GmlDrawing]
  . . .
  diagram.createElement("gml:Note", {"text":"Some remarks", "#ASPECT[g:bbox]":"10 10 100 50"})
Is equivalent to:
  Aspect BasicShape for core.svg:GmlDrawing
  . . .
  diagram.createElement("gml:Note", {"text":"Some remarks", "@bbox":"10 10 100 50"})

(3) #CACHE Pragma
Syntax: #CACHE[ON|OFF]
This pragma enables or disables caching of the containing resource file. By default, resource caching is enabled. This pragma is only relevant for development time (SRC resources). This pragma is usually used in conjunction with the #INCLUDE pragma.
Example
Before:
  #CACHE[OFF]
After:
Side-effect: Resource will not be cached (4) #DEFINE Pragma
Syntax: #DEFINE[name=value]
This pragma defines a constant value that later can be used with the #VALUE pragma. The defined name is case-insensitive. Related #DEFINE pragmas may be placed in a common resource file, and included it in any other resource file with the #INCLUDE pragma. This pragma is generally used to create global constants and enumerations to improve code maintainability.
Example
Before:
  #DEFINE[VALID=#0x01]
  . . .
  if (flag & #[VALID]) { }
After:
  if (flag & 0x01) { }

(5) #DEVTIME Pragma

Syntax: #DEVTIME [text]
This pragma declares a block of text that will only be included in the development time (SRC) version of the containing resource.
Example
Before:
    #DEVTIME[SCTL.sdkEnabled=true]
After: (development time)
    $CTL.sdkEnabled=true
After: (runtime)
    (6) #LOG, #TRACE, #LOGTRACE Pragmas
Syntax: #LOG[level,text, <category>]
    #TRACE[level,text, <location>]
    #LOGTRACE[level,text, <category>, <location>]
These pragmas write a log or trace or both messages to the console. Log/trace messages may be sent to the server to be written to the standard J2EE log/trace (if the modeling tool is configured for it). When written into the J2EE log/trace, the messages contain the exact location from which they were generated including package, source file and line number. In one embodiment, possible Values for the level property are: 1=Information; 2=Warning; and 4=Error
Location and category are optional parameters which determine the Location\Category of the message. If:
    1) No category specified→message logged to a default tool Core Category
    2) No location specified→message logged to a Location which will be composed from the package name.
    (7) #INCLUDE Pragma
syntax: #INCLUDE[urn]
This pragma embeds a resource into another resource in place. Since the resource file is embedded in place, changes in the embedded resource file may not affect the embedding resource file if the files are cached (this is in contrast to the #USING pragma). Therefore, in certain cases the #CACHE pragma may need to be used to disable caching of the embedding resource file. The #INCLUDE pragma is also allowed in the embedded resources. This nesting may continue to any arbitrary depth. A resource is always embedded at most once, even if multiple #INCLUDE pragmas that reference it are encountered. In eon embodiment, if a special resource file "defs.inc" is placed in a package, then it will be automatically included in every resource file in that package. This pragma is used mainly for including common definition files. For other cases, the #USING pragma may be used.
    (8) #NS Pragma
Syntax: #NS [name]
This pragma converts a name to a fully qualified name (qname) by prefixing it with the current namespace (the name of the package that contains the resource file). This pragma is generally used when unique and qualified names are required, for example, in kit extensions definitions.
Example
Before:
    $ENV.defineEnumeration('#NS[CHARTTYPES]',
    '1:Area;2:Bars;3:Cols;4:Lines;5:Pie');
After:
    $ENV.defineEnumeration('com.sap.rendering:CHARTTYPES', '1:Area;2:Bars;3:Cols;4:Lines;5:Pie');
    (9) #RUNTIME Pragma
Syntax: #RUNTIME [text]
This pragma declares a block of text that will only be included in the runtime (BIN) version of the containing resource.
Example
Before:
    #RUNTIME[*** do not modify this file]
After: (development time)
After: (runtime)
    *** do not modify this file
    (10) #SYS Pragma
Syntax: #SYS[name]
This pragma is used to access a specified system setting (e.g., from the server.ini file of a current installation). This pragma is generally used to avoid hard coding any system/server/product specific data, such as branding, version, protocol, etc.
Available system settings:

| | |
|---|---|
| SERVER_PROTOCOL | // GKB server protocol |
| SERVER_VERSION | // GKB server version |
| SERVER_LABEL | // Friendly label for GKB server |
| PRODUCT_FULLNAME | // Product full name (e.g., SAP NetWeaver Visual Composer) |
| PRODUCT_NAME | // Product name (e.g., Visual Composer) |
| PRODUCT_ACRONYM | // Product acronym (e.g., GM) |
| PRODUCT_LOGO | // Url of product logo |
| PRODUCT_BANNER | // Url of product About banner |
| PRODUCT_SPLASH | // Url of product splash image |
| STARTUP_PAGE | // Url of product bootstrapping page |
| COPYRIGHTS | // Product copyrights message |

Example
Before: alert("#SYS[PRODUCT_NAME], V#SYS[SERVER_VERSION]")
After: alert("Visual Composer, V2.1.0")
    (11) #TEXT Pragma
Syntax: #TEXT [urn]
This pragma is used to access a specified locale-specific string resource. This pragma is generally used to avoid hard coding any string resources such as labels, messages, errors, popups, menu captions, tooltips, etc.
Example
Before:
    PROMPT("#TEXT[~lang:E1001.txt]")
After:
    PROMPT("Error: Invalid kits configuration")
    (12) #URL Pragma
Syntax: #URL[urn]
This pragma converts a logical URN to a physical URL address. This pragma is used instead of using URLs directly (absolute URLs or relative URLs).
Examples: Displaying an image
Before: <IMG src="#URL[~skin:icons.copy.gif]">
After: <IMG src="http://gkbserver/storyboard/com.gm.studio/res/skin/gm/icons/copy.gif">
Example: Opening a dialog
Before: MODAL('#URL[common.AboutDlg.htm]')
After:      MODAL('http://gkbserver/bin/fetcher.asp?urn=studio:common.AboutDlg.htm');
    (13) #USING Pragma
Syntax: #USING[urn]
This pragma embeds a resource into another resource by reference. In one embodiment, the embedding resource type may be one of: .htm, .htc, .svg, and the embedded resource type may be one of .js, .css, .htc. Since the resource file is embedded by reference, any changes in the embedded resource file affect the embedding resource file. This is true even if both resource files are cached (in contrast to the #INCLUDE pragma). The #USING pragma is also allowed in the embedded resources. This nesting can continue to any arbitrary depth. A resource is always embedded at most once, even if multiple #USING pragmas that reference it are encountered. Dependencies declared in the embedded resource (using a #DEPENDENCIES pragma) are automatically expanded in the embedding resource, as though a corresponding #USING pragma was specifically written in the embedding resource. This pragma is used to enhance code modularity and reuse. This pragma is preferred over the #INCLUDE if the embedding/embedded resource types are compatible with the types listed above.
Example
Before:
   #USING[lib:Global.js]
   #USING[lib:Scroller.htc]
   #USING[lib:SmartForm.htc]
After:
<SCRIPT src="fetcher.asp?urn=com.gm.lib:Basic.js" language="JavaScript"></SCRIPT>
<SCRIPT src="fetcher.asp?urn=com.gm.lib:EventsMgr.js" language="JavaScript"></SCRIPT>
<SCRIPT src="fetcher.asp?urn=com.gm.lib:PopupMgr.js" language="JavaScript"></SCRIPT>
<LINK REL=stylesheet HREF="fetcher.asp?urn=com.gm.lib~skin:styles.Global.css" type="text/css">
<SCRIPT src="fetcher.asp?urn=com.gm.lib:Global.js" language="JavaScript"></SCRIPT>
<?IMPORT namespace="STB" implementation="fetcher.asp?urn=com.gm.lib:Scroller.htc"/>
<SCRIPT src="fetcher.asp?urn=com.gm.lib:ColorMgr.js" language="JavaScript"></SCRIPT>
<SCRIPT src="fetcher.asp?urn=com.gm.lib:EnumMgr.js" language="JavaScript"></SCRIPT>
<LINK REL=stylesheet HREF="fetcher.asp?urn=com.gm.lib~skin:styles.Input.css" type="text/css">
<SCRIPT src="fetcher.asp?urn=com.gm.lib:InputMgr.js" language="JavaScript"></SCRIPT>
<LINK REL=stylesheet HREF="fetcher.asp?urn=com.gm.lib~skin:styles.Button.css" type="text/css">
<LINK REL=stylesheet HREF="fetcher.asp?urn=com.gm.lib~skin:styles.Choice.css" type="text/css">
<LINK REL=stylesheet HREF="fetcher.asp?urn=com.gm.lib~skin:styles.Palette.css" type="text/css">
<?IMPORT namespace="STB" implementation="fetcher.asp?urn=com.gm.lib:SmartForm.htc"/>

(14) #VALUE Pragma
Syntax: #VALUE[name] or #[name]
This pragma is used to access a value previously defined using the #DEFINE pragma. The value name is case-insensitive. In one embodiment, only values defined within the containing resource file may be accessed, or any included definition files (see the #INCLUDE pragma). In addition, the color names from the built-in colors scheme (see next slide) are always defined. This pragma is generally used to access global constants and enumerations to improve code maintainability.
Example
Before:
   #DEFINE[VALID=#0x01]
   ...
   if (flag & #[VALID]) { }
After:
   if (flag & 0x01) { }

The #VALUE pragma also has a shortcut notation useful for bitwise combination of flag values:
   #VALUE[name1|name2| . . . |name$_n$]
is a shortcut for
   #VALUE[name1]|#VALUE[name2]| . . . #VALUE[name$_n$]
Example
All the notations written below are exactly equivalent:
   #VALUE[SVG_CLASSIC_ARROW]|#VALUE[SVG_FILLED]|#VALUE[SVG_INBOUND]
   #VALUE[SVG_CLASSIC_ARROW|SVG_FILLED|SVG_INBOUND]
   #[SVG_CLASSIC_ARROW]|#[SVG_FILLED]|#[SVG_INBOUND]
   #[SVG_CLASSIC_ARROW|SVG_FILLED|SVG_INBOUND]
   0x02|0x20|0x40
   0x62
   98

In one embodiment, built-in colors scheme may be accessed using the #VALUE pragma with the following color names:

| | |
|---|---|
| #[FG1] / #[FG2] | // Primary/secondary foreground colors |
| #[BG1] / #[BG2] | // Primary/secondary background colors |
| #[BR1] / #[BR2] | // Primary/secondary border colors |
| #[CL1] / #[CL2] | // Primary/secondary colors |
| #[HOT] / #[ERR] | // Hot/Error colors |
| #[DIS] / #[DIS2] | // Disabled text/border colors |
| #[SCROLLBAR] | // Composite scrollbar colors |
| #[BLK] / #[WHS] / #[WHT] | // Black/Whitesmoke/White colors |

(15) #ERR, #WARN, #INFO pragmas
Syntax: #ERR[text]
   #WARN[text]
   #INFO[text]
These pragmas are used to write an error, warning, or information message (respectively) to the output console, if logging is enabled.
Example

```
method Foo ( )
   try {
      . . .
   } catch(e) {
      #ERR['Error encountered: '+e. description]
   end
```

Figure 37:
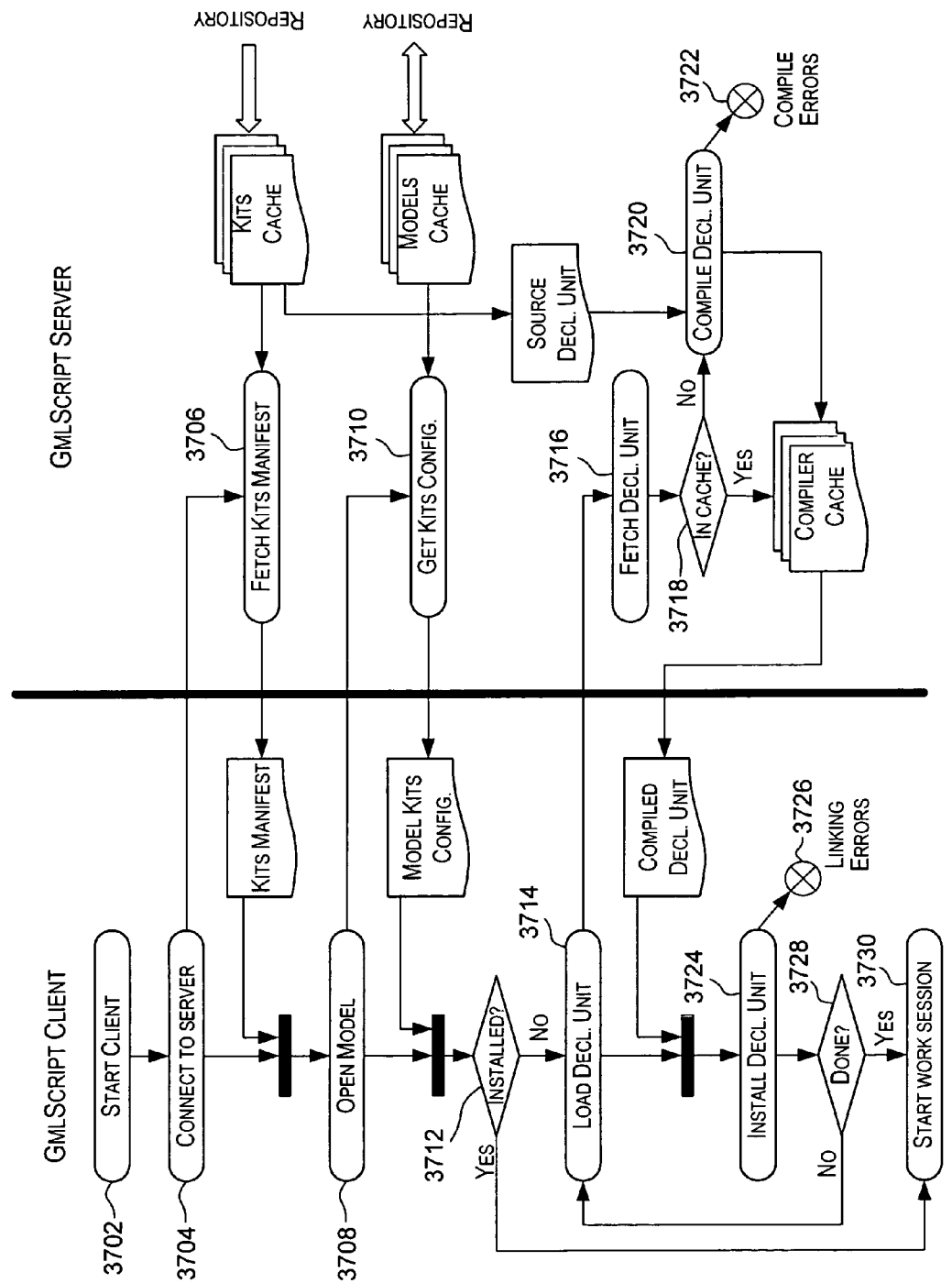
FIG. 37 depicts an example of a GmlScript installation process according to an embodiment of the present invention.

(16) #EXTERN and #DEPENDENCIES pragmas
Syntax: #EXTERN[urn]
   #DEPENDENCIES[urn-list]
Install on Demand
GmlScript supports on demand installation. FIG. 37 depicts an example of a GmlScript installation process according to an embodiment of the present invention. For example, the process depicted in FIG. 37 may be performed by a Visual Composer GmlScript client and a Visual Composer GmlScript server. As depicted in FIG. 37, a user may start a GmlScript client (step 3702). For example, a Visual Composer user may start a client Storyboard. The client then connects to the GmlScript server and requests a kits manifest (step 3704). Upon connection, the GmlScript server fetches a kits manifest corresponding to the client request from a kits cache in the server repository (step 3706). The fetched kits manifest is then communicated to the client. A sample kits manifest is depicted in FIG. 38. As depicted in FIG. 38, the manifest identifies several packages and kit names.

The client may then open a model using the kits manifest received from the server (step 3708). The open request is communicated from the client to the server. In response, the server fetches kits configuration information from a model cache in the repository and forwards the kits configuration information to the client. A sample kits configuration file is depicted in FIG. 39. As depicted in FIG. 39, the configuration information identifies several kit packages. Each package may comprise one or more declaration units.

The client then determines if all the needed declaration units have been installed (step 3712). If it is determined that all the declaration units have been installed, then the user is ready to start a work session per step 3730. If a declaration unit is not installed then the client initiates processing to load the declaration unit (step 3714). As part of 3714, a request for the declaration unit is communicated from the client to the server. The server then initiates processing to fetch the requested declaration unit (step 3716). As part of 3716, the server first determines if the compiled declaration unit is present in the cache and does not predate the source file corresponding to the compiled unit (step 3718). If is it determined that the compiled declaration unit is present in the cache and does not predate the source file corresponding to the unit, then the compiled declaration unit is retrieved from the cache storing compiled units and forwarded to the client. If it is determined that either the compiled declaration unit is not present in the cache or even if present predates the source file (source declaration unit) corresponding to the unit, then the source declaration unit is compiled to form a compiled declaration unit (step 3720). An exception is raised and processing is terminated if there are any compilation errors (step 3722). Upon successful compilation, the compiled declaration unit is stored in the compiled units cache and also forwarded to the client.

The client then installs the compiled unit received from the server (step 3724). If there are any errors in the installation process, then an exception is raised and processing is terminated (step 3726). Upon successful installation of a compiled declaration unit, client checks if any additional declaration units need to be loaded (step 3728). If so, then processing continues with step 3714. If all the needed units have been loaded and installed, then processing continues with step 3730 wherein a user may start a work session.

FIG. 40 depicts a sample kits declaration file according to an embodiment of the present invention.

Figure 41:
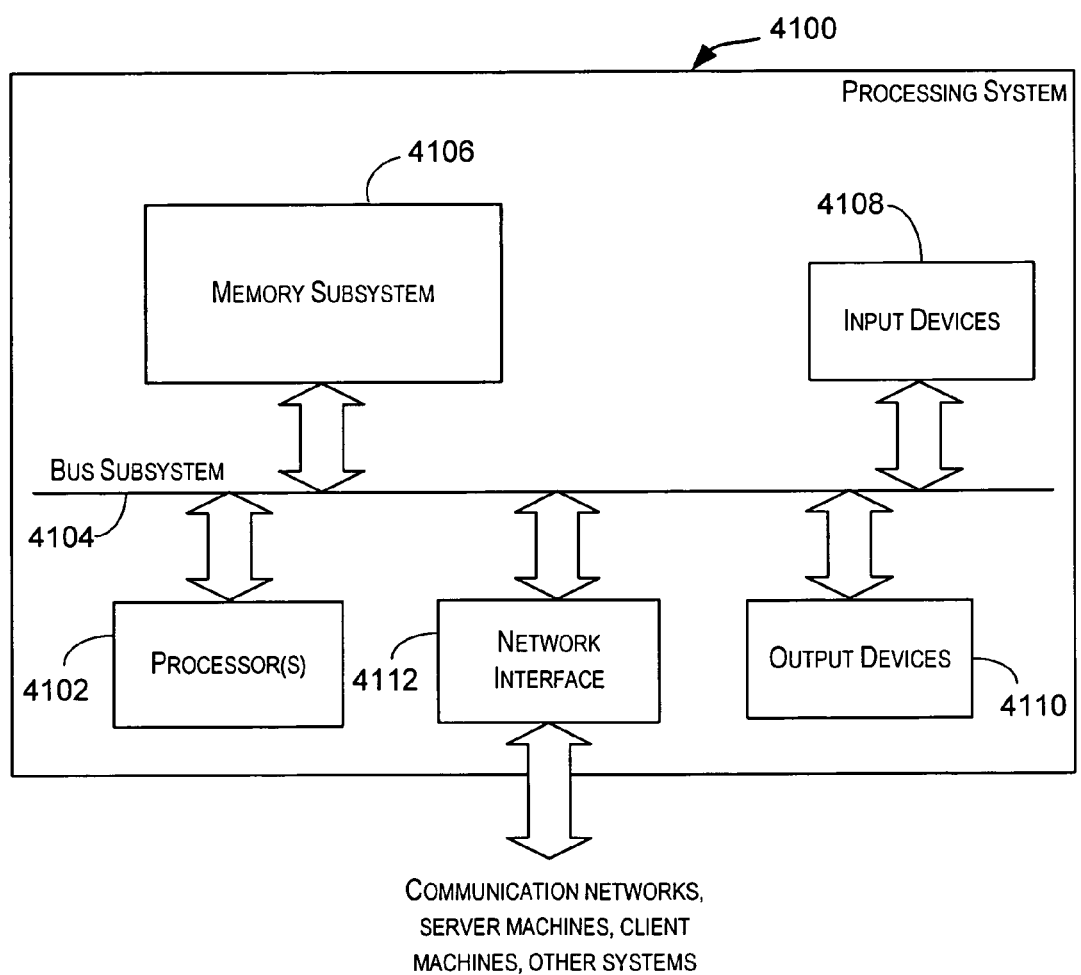
FIG. 41 is a simplified block diagram of a processing system that may be used to practice an embodiment of the present invention.

FIG. 41 is a simplified block diagram of a processing system 4100 that may be used to practice an embodiment of the present invention. For example, system 4100 may be a client machine or a server machine or a standalone machine hosting both a client and a server. As shown in FIG. 41, system 4100 includes a processor 4102 that communicates with a number of peripheral devices via a bus subsystem 4104. These peripheral devices may include a memory subsystem 4106, input devices 4108, output devices 4110, and a network interface subsystem 4112. Bus subsystem 4104 provides a mechanism for letting the various components and subsystems of system 4100 communicate with each other as intended. Although bus subsystem 4104 is shown schematically as a single bus, alternative embodiments of the bus subsystem may utilize multiple busses.

Processor 4102 is configured to perform processing performed by system 4100. For example, processor 4102 may be configured to execute code modules or instructions to perform processing according to an embodiment of the present invention. Processor 4102 may also control other subsystems or devices.

Input devices 4108 enable a user such as a developer to interact with and provide information to system 4100. Input devices 4108 may include wired or wireless devices such as a keyboard, pointing devices such as a mouse, trackball, touchpad, or graphics tablet, a scanner, a touchscreen incorporated into the display, audio input devices such as voice recognition systems, microphones, and other types of input devices. In general, an input device may refer to any device or mechanism that may be used for inputting information to system 4100.

Output devices 4110 may include wired or wireless devices such as a display subsystem, a printer, a fax machine, or non-visual displays such as audio output devices, etc. Examples of a display subsystem include a cathode ray tube (CRT), a flat-panel device such as a liquid crystal display (LCD), a projection device, etc. In general, an output device may refer to any device or mechanism for outputting information from system 4100.

Network interface subsystem 4112 provides an interface to other computer systems, servers, client machines, and networks. Network interface subsystem 4112 serves as an interface for receiving data from other sources and for transmitting data to other sources from system 4100. Embodiments of network interface subsystem 4112 include an Ethernet card, a modem (telephone, satellite, cable, ISDN, etc.), (asynchronous) digital subscriber line (DSL) units, and the like. Network interface subsystem 4112 may not be used in a standalone embodiment.

Memory subsystem 4106 may be configured to store the basic programming and data constructs that provide the functionality of the present invention. For example, software code modules (or instructions) implementing the functionality of the present invention may be stored in memory 4106. These software modules may be executed by processor(s) 4102. Memory 4106 may also provide a repository for storing data used in accordance with the present invention. For example, when operating as a server, memory 4106 may store source GmlScript files, complied JavaScript files, etc.

Memory 4106 may include a number of memories including a main random access memory (RAM) for storage of instructions and data during program execution and a read only memory (ROM) in which fixed instructions are stored. RAM is generally semiconductor-based memory that can be read and written by processor 4102. The storage locations can be accessed in any order. RAM is generally understood to refer to volatile memory that can be written to as well as read. There are various different types of RAM.

Memory 4106 may also comprise subsystems that provide persistent (non-volatile) storage and caching for program and data files, and may include a hard disk drive, a floppy disk drive along with associated removable media, a Compact Disk Read Only Memory (CD-ROM) drive, an optical drive such as a DVD, removable media cartridges, flash memory, and other like storage media.

Processing system 4100 can be of various types including a personal computer, a portable computer, a workstation, a network computer, a mainframe, a kiosk, or any other data processing system. Due to the ever-changing nature of computers and networks, the description of system 4100 depicted in FIG. 41 is intended only as a specific example for purposes of illustrating the preferred embodiment of a processing system. Many other configurations having more or fewer components than the system depicted in FIG. 41 are possible.

As described above, GmlScript meets the requirements of browser-based modeling frameworks like SAP Netweaver Visual Composer. GmlScript may also be used for much broader categories of software development. For example, GmlScript may be used to develop rich web applications. Any rich, browser-based, software such as highly interactive applications, productivity tools, distributed development tools, collaboration tools, web games, and many more can benefit from the features of GmlScript that facilitate development in the browser. Especially noteworthy are features such as object-oriented programming, namespaces and self-contained components, dynamic loading, and automatic persistency, and others, which are not provided by any available browser scripting language such as JavaScript or VBScript.

GmlScript may also be used for extensible model-driven frameworks: Any extensible modeling framework (not only within browser) can benefit from the features of GmlScript that facilitate development of modeling tools and model-driven applications. For example, features such as aspects, prototypes, transactions, undo/redo, model dynamics and constraints, and automatic persistency, and others, which are not provided by any traditional object-oriented programming language (such as Java, C++, or C#) are provided by Gml-Script.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of processing a request from a client program, the method comprising:
   receiving a request for an application from a client program, wherein the client program is a modeling framework that enables applications to be developed;
   after receiving the request for the application from the client program, determining a first source code corresponding to the application, the first source code written in a first programming language, the first source code comprising code declaring at least a first object class that inherits from another object class;
   after the determining of the first source code corresponding to the application, compiling the first source code to generate a second source code in JavaScript, wherein the second source code is executable by the client program and usable in development of the applications to be developed; and
   executing the second source code using the client program, including:
      loading one or more classes identified in the second source code,
      loading one or more objects instantiated from the one or more classes, and
      partitioning, by a namespace manager of the client program, a namespace of the client program into at least a first namespace and a second namespace, wherein (1) a first class and a first object associated with the first programming language are loaded in the first namespace and (2) a second class and a second object associated with a JavaScript engine typically having a single global namespace are loaded in the second namespace.

2. The method of claim 1 wherein the client program is hosted by a web browser and the second source code is executed within the web browser.

3. The method of claim 1 wherein the first source code comprises code for instantiating an object of the first object class, wherein the instantiated object is persistent.

4. The method of claim 1 wherein the first source code comprises one or more pragmas, the method further comprising:
   identifying, prior to the compiling, the one or more pragmas in the first source code; and
   substituting, prior to the compiling, each pragma in the one or more pragmas with a corresponding pragma output.

5. The method of claim 1 wherein the second source code comprises metadata, the method further comprising:
   performing introspection of an object created by execution of the second source code using the metadata.

6. The method of claim 1 wherein the first source code declares a property of a first data type associated with the first object class.

7. The method of claim 1 wherein the first source code comprises an event declaration that causes instantiation of an event object when the second source code is executed, wherein the event object provides a notification upon occurrence of an event specified by the event declaration.

8. The method of claim 7 wherein the first source code further comprises a listener block that is invoked when the event specified by the event declaration occurs.

9. The method of claim 1 wherein the first source code declares an aspect class that is attached to the first object class and causes an aspect object to be instantiated and attached to an object instantiated from the first object class.

10. The method of claim 1 wherein the first source code comprises an event transaction declaration that causes instantiation of a transaction object that records updates to other one or more objects.

11. In a network environment comprising a client machine coupled to a server machine via a communication network, a method of processing a request received from the client machine, the method comprising:
   storing, at the server machine, a set of source files;
   receiving, at the server machine, a request for an application from a client program executing on the client machine;
   responsive to the request, determining, at the server machine, a first source file for the application from the set of source files, the first source file written in a first language, the first source file comprising a set of pragmas and code declaring at least a first object class that inherits from another object class;
   generating, at the server machine, a preprocessed first source file by replacing each pragma in the first source file with a corresponding pragma output;
   generating, at the server machine, a second source file from the preprocessed first source file, wherein the second source file is written in a JavaScript executable by the client program;
   communicating the second source file from the server machine to the client machine over the communication network; and
   executing the second source file using the client program, including:

loading one or more classes identified in the second source file, loading one or more objects instantiated from the one or more classes, and partitioning, by a namespace manager of the client program, a namespace of the client program into at least a first namespace and a second namespace, wherein (1) a first class and a first object associated with the first programming language are loaded in the first namespace and (2) a second class and a second object associated with a JavaScript engine typically having a single global namespace are loaded in the second namespace.

12. The method of claim 11 wherein the client program is modeling framework.

13. The method of claim 11 wherein the client program is hosted by a web browser and the second source file is executed within the web browser.

14. The method of claim 11 wherein the first source file comprises code for instantiating an object of the first object class, wherein the instantiated object persists after execution of the client program has ended.

15. The method of claim 11 wherein the second source file comprises metadata, the method further comprising:

performing introspection of an object created by execution of second source file using the metadata.

16. The method of claim 11 wherein the first source file comprises:

an event declaration that causes, upon execution of the second source file, instantiation of an event object that provides a notification upon occurrence of an event specified by the event declaration; and a listener block that is invoked when the event specified by the event declaration occurs.

17. The method of claim 11 wherein the first source file comprises code declaring an aspect class that is attached to the first object class and which causes an aspect object to be instantiated and attached to an object instantiated from the first object class when the second source file is executed.

18. The method of claim 11 wherein the first source file comprises code declaring an event transaction that causes, upon execution of the second source file, instantiation of a transaction object that records updates to other one or more objects.

19. A system for processing a request received from a client machine, the system comprising:

a server machine; and a client machine coupled to the server machine via a communication network;

wherein the server machine is adapted to:

store a set of source files;

receive a request for an application from a client program executing on the client machine;

after receiving the request for the application, determine a first source file for the application from the set of source files, the first source file written in a first programming language, the first source file comprising a set of pragmas, and code declaring at least a first object class that inherits from another object class;

after the determining of the first source file, generate a preprocessed first source file by replacing, using a preprocessor, each pragma in the first source file with a corresponding pragma output;

generate a second source file from the preprocessed first source file, wherein the second source file is written in JavaScript executable by the client program;

communicate the second source file to the client machine over the communication network; and wherein the client machine is adapted to execute the second source file using the client program, including:

loading one or more classes identified in the second source file, loading one or more objects instantiated from the one or more classes, and partitioning, by a namespace manager of the client program, a namespace of the client program into at least a first namespace and a second namespace, wherein (1) a first class and a first object associated with the first programming language are loaded in the first namespace and a second class and (2) a second object associated with a JavaScript engine typically having a single global namespace are loaded in the second namespace.

\* \* \* \* \*